(12) United States Patent
Takado

(10) Patent No.: US 10,044,992 B2
(45) Date of Patent: Aug. 7, 2018

(54) SOLID-STATE IMAGING APPARATUS, DRIVING METHOD THEREFOR, AND IMAGING SYSTEM

(71) Applicant: CANON KABUSHIKI KAISHA, Tokyo (JP)

(72) Inventor: Hisashi Takado, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/874,636

(22) Filed: Oct. 5, 2015

(65) Prior Publication Data

US 2016/0112663 A1 Apr. 21, 2016

(30) Foreign Application Priority Data

Oct. 17, 2014 (JP) .................................. 2014-213122

(51) Int. Cl.
*H04N 9/04* (2006.01)
*H04N 5/355* (2011.01)
*H04N 5/374* (2011.01)
*H04N 5/353* (2011.01)

(52) U.S. Cl.
CPC .......... *H04N 9/045* (2013.01); *H04N 5/3535* (2013.01); *H04N 5/35554* (2013.01); *H04N 5/374* (2013.01)

(58) Field of Classification Search
CPC ......... H04N 5/372; H04N 5/378; H04N 9/045
See application file for complete search history.

(56) References Cited

U.S. PATENT DOCUMENTS 6,791,614 B1 * 9/2004 Kimura ................ H04N 5/3537
257/229
6,894,812 B1 * 5/2005 Spears ................... H04N 1/193
348/294
8,164,651 B2 * 4/2012 Hamilton, Jr. ......... H04N 5/235
348/229.1

(Continued)

FOREIGN PATENT DOCUMENTS

JP 2008-219830 9/2008

OTHER PUBLICATIONS

U.S. Appl. No. 14/926,125, filed Oct. 29, 2015, Hisashi Takado.
U.S. Appl. No. 14/956,798, filed Dec. 2, 2015, Kazuyuki Shigeta.

*Primary Examiner* — Jason A Flohre
(74) *Attorney, Agent, or Firm* — Fitzpatrick, Cella, Harper & Scinto

(57) ABSTRACT

A solid-state imaging apparatus comprises a pixel unit including G-pixels 110-G, R-pixels 110-R, and B-pixels 110-B, an image signal output interval of the G-pixels 110 made shorter than image signal output intervals of the R-pixels and B-pixels. Regarding lights respectively having wavelength bands near a green color, near a red color, and near a blue color, the G-pixels 110-G have higher sensitivity to the wavelength band near the green color than both to the wavelength band near the red color and wavelength band near the blue color, the R-pixels 110-R have higher sensitivity to the wavelength band near the red color than both to the wavelength band near the green color and wavelength band near the blue color, and the B-pixels 110-B have higher sensitivity to the wavelength band near the blue color than both to the wavelength band near the green color and wavelength band near the red color.

20 Claims, 16 Drawing Sheets

(56) References Cited

U.S. PATENT DOCUMENTS

| | | | | |
|---|---|---|---|---|
| 2002/0021364 A1* | 2/2002 | Asada | H04N 5/232 | 348/312 |
| 2004/0169747 A1* | 9/2004 | Ono | H04N 9/045 | 348/272 |
| 2004/0189844 A1* | 9/2004 | McCaffrey | H04N 9/045 | 348/308 |
| 2006/0192867 A1* | 8/2006 | Yosefin | H04N 5/3535 | 348/273 |
| 2006/0192873 A1* | 8/2006 | Yaffe | H04N 5/353 | 348/297 |
| 2008/0087800 A1* | 4/2008 | Toda | H01L 27/14603 | 250/214 C |
| 2008/0128598 A1* | 6/2008 | Kanai | H04N 5/3537 | 250/226 |
| 2009/0195681 A1* | 8/2009 | Compton | H04N 5/23245 | 348/308 |
| 2010/0271515 A1* | 10/2010 | Imagawa | H04N 5/3537 | 348/266 |
| 2011/0063460 A1* | 3/2011 | Tokui | H04N 5/23248 | 348/208.4 |
| 2011/0069189 A1* | 3/2011 | Venkataraman | H04N 5/23296 | 348/218.1 |
| 2011/0279693 A1* | 11/2011 | Hamada | H04N 5/335 | 348/208.4 |
| 2012/0229667 A1* | 9/2012 | Tsunekawa | H04N 5/2628 | 348/222.1 |
| 2013/0093923 A1* | 4/2013 | Imagawa | H04N 5/23232 | 348/239 |
| 2014/0160318 A1* | 6/2014 | Blanquart | H04N 5/2354 | 348/234 |
| 2015/0116555 A1* | 4/2015 | Hayashi | H04N 9/045 | 348/280 |
| 2015/0373250 A1* | 12/2015 | Sfaradi | H04N 5/23212 | 348/345 |

* cited by examiner

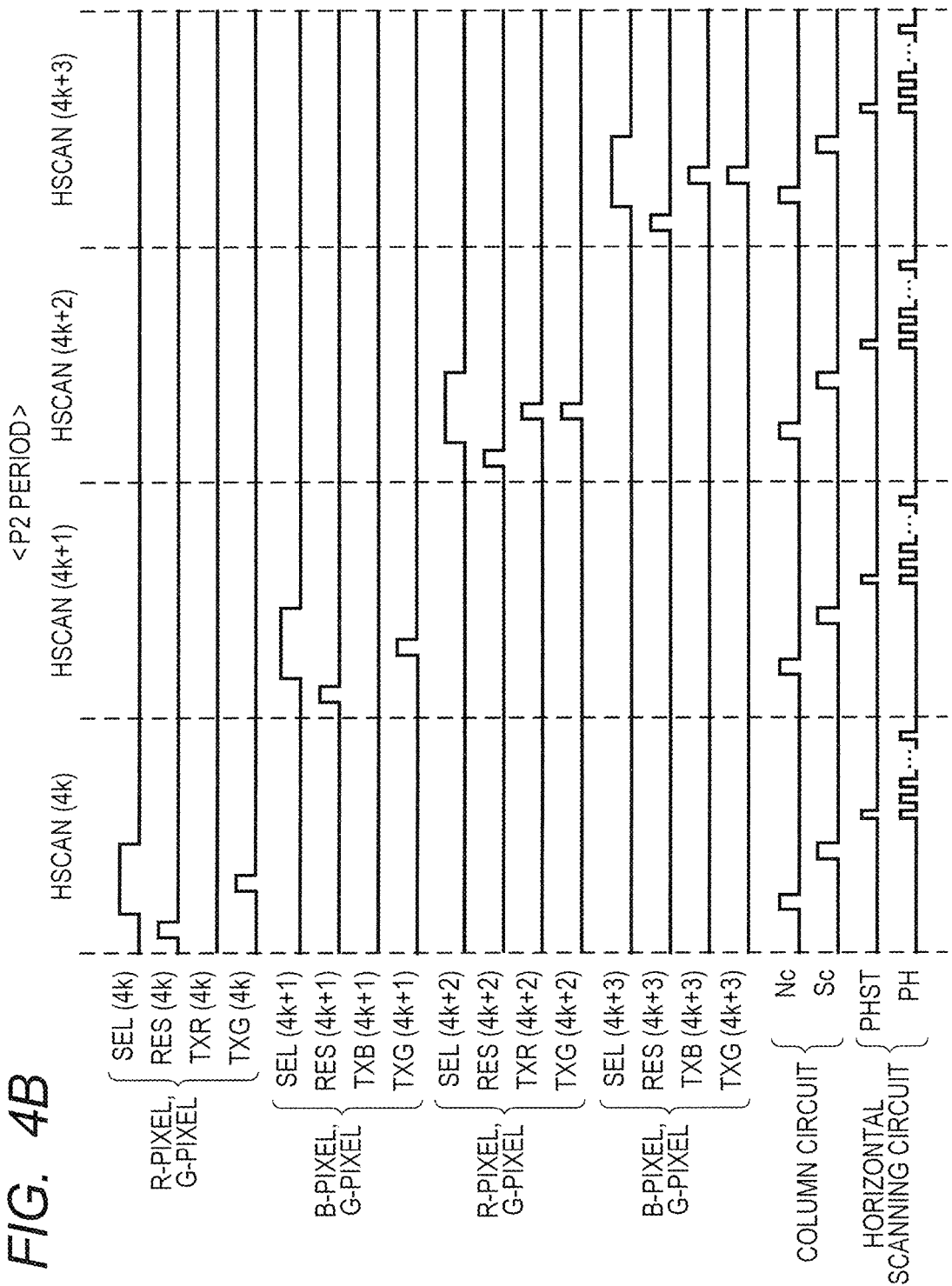

*FIG. 5A* <P1 PERIOD>

*FIG. 5B* <P2 PERIOD>

*FIG. 5C* <P1 PERIOD>

FIG. 7A

<P1 PERIOD>

|  | m-th COLUMN | m+1-th COLUMN | m+2-th COLUMN | m+3-th COLUMN |
|---|---|---|---|---|
| 6k-th ROW | R | G | R | G |
| 6k+1-th ROW | G | B | G | B |
| 6k+2-th ROW | R | G | R | G |
| 6k+3-th ROW | G | B | G | B |
| 6k+4-th ROW | R | G | R | G |
| 6k+5-th ROW | G | B | G | B |

FIG. 7B

<P2 PERIOD>

|  | m-th COLUMN | m+1-th COLUMN | m+2-th COLUMN | m+3-th COLUMN |
|---|---|---|---|---|
| 6k-th ROW | R | G | R | G |
| 6k+1-th ROW | G | B | G | B |
| 6k+2-th ROW | R | G | R | G |
| 6k+3-th ROW | G | B | G | B |
| 6k+4-th ROW | R | G | R | G |
| 6k+5-th ROW | G | B | G | B |

FIG. 7C

<P3 PERIOD>

|  | m-th COLUMN | m+1-th COLUMN | m+2-th COLUMN | m+3-th COLUMN |
|---|---|---|---|---|
| 6k-th ROW | R | G | R | G |
| 6k+1-th ROW | G | B | G | B |
| 6k+2-th ROW | R | G | R | G |
| 6k+3-th ROW | G | B | G | B |
| 6k+4-th ROW | R | G | R | G |
| 6k+5-th ROW | G | B | G | B |

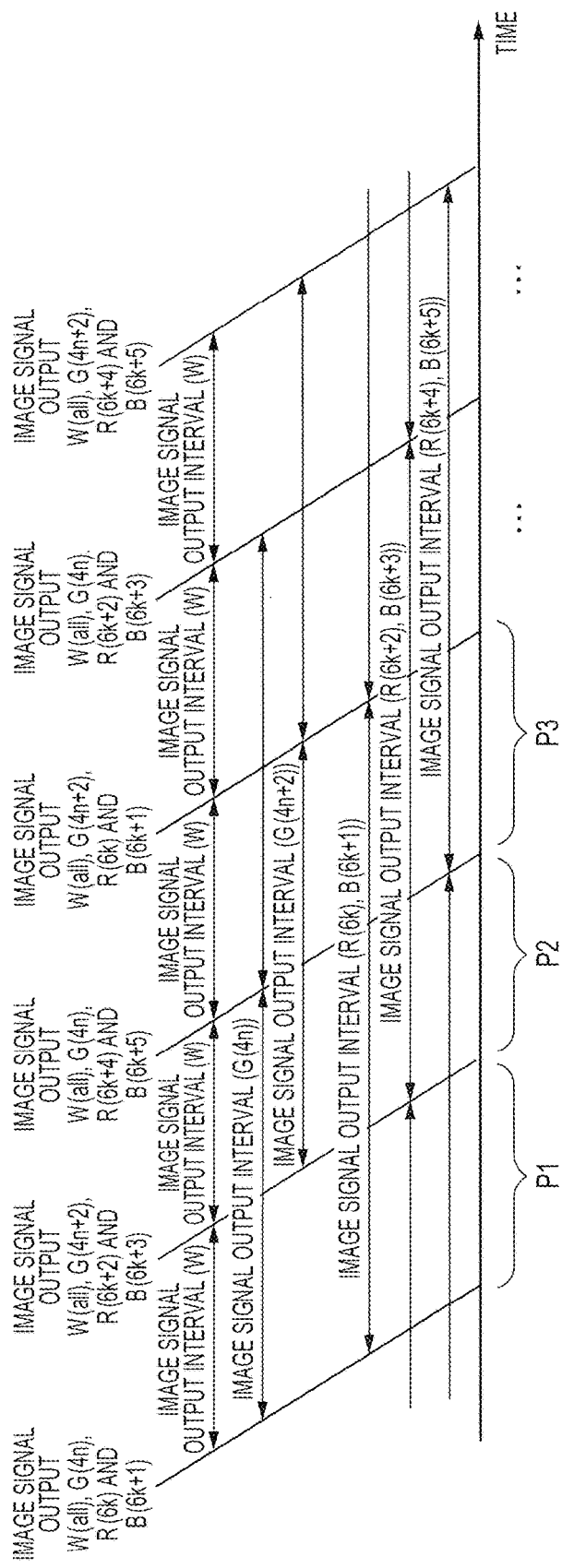

*FIG. 12A*

<P1 PERIOD>

| | m-th COLUMN | m+1-th COLUMN | m+2-th COLUMN | m+3-th COLUMN |
|---|---|---|---|---|
| 6k-th ROW | R | G | R | G |
| 6k+1-th ROW | W | B | W | B |
| 6k+2-th ROW | R | G | R | G |
| 6k+3-th ROW | W | B | W | B |
| 6k+4-th ROW | R | G | R | G |
| 6k+5-th ROW | W | B | W | B |

*FIG. 12B*

<P2 PERIOD>

| | m-th COLUMN | m+1-th COLUMN | m+2-th COLUMN | m+3-th COLUMN |
|---|---|---|---|---|
| 6k-th ROW | W | G | R | G |
| 6k+1-th ROW | R | B | W | B |
| 6k+2-th ROW | W | G | R | G |
| 6k+3-th ROW | R | B | W | B |
| 6k+4-th ROW | W | G | R | G |
| 6k+5-th ROW | R | B | W | B |

*FIG. 12C*

<P3 PERIOD>

| | m-th COLUMN | m+1-th COLUMN | m+2-th COLUMN | m+3-th COLUMN |
|---|---|---|---|---|
| 6k-th ROW | R | G | R | G |
| 6k+1-th ROW | W | B | W | B |
| 6k+2-th ROW | R | G | R | G |
| 6k+3-th ROW | W | B | W | B |
| 6k+4-th ROW | R | G | R | G |
| 6k+5-th ROW | W | B | W | B |

FIG. 14A <P1 PERIOD>

| | m-th COLUMN | m+1-th COLUMN | m+2-th COLUMN | m+3-th COLUMN |
|---|---|---|---|---|
| 6k-th ROW | R | G | R | G |
| 6k+1-th ROW | W | B | W | B |
| 6k+2-th ROW | R | G | R | G |
| 6k+3-th ROW | W | B | W | B |
| 6k+4-th ROW | R | G | R | G |
| 6k+5-th ROW | W | B | W | B |

FIG. 14B <P2 PERIOD>

| | m-th COLUMN | m+1-th COLUMN | m+2-th COLUMN | m+3-th COLUMN |
|---|---|---|---|---|
| | R | G | R | G |
| | W | B | W | B |
| | R | G | R | G |
| | W | B | W | B |
| | R | G | R | G |
| | W | B | W | B |

FIG. 14C <P1 PERIOD>

| m-th COLUMN | m+1-th COLUMN | m+2-th COLUMN | m+3-th COLUMN |
|---|---|---|---|
| R | G | R | G |
| W | B | W | B |
| R | G | R | G |
| W | B | W | B |
| R | G | R | G |
| W | B | W | B |

SOLID-STATE IMAGING APPARATUS, DRIVING METHOD THEREFOR, AND IMAGING SYSTEM

BACKGROUND OF THE INVENTION

Field of the Invention

The present invention relates to a solid-state imaging apparatus and driving method therefor as well as to an imaging system equipped with the solid-state imaging apparatus.

Description of the Related Art

Solid-state imaging apparatus adapted to acquire color images widely use a method which acquires color information using a single panel on which color filters having spectral characteristics of transmitting lights in wavelength bands corresponding, for example, to green, red, and blue are arrayed on a pixel by pixel basis.

With the pixels (imaging elements) on which color filters are arrayed, since the color filters of different colors differ in transmittance, the sensitivity of the pixels (imaging elements) varies from color to color. Therefore, when the pixels are driven for a same charge accumulation period, the charge accumulation period may be optimal for the pixels equipped with a certain color filter, but may not necessarily be optimal for pixels equipped with another color filter.

Japanese Patent Application Laid-Open No. 2008-219830 discloses an imaging apparatus in which pixels of different colors are driven for different accumulation periods such that the accumulation periods will coincide in center position with one another. The imaging apparatus is characterized in that accumulation start time and accumulation end time for color pixels are varied among green, red, and blue colors so as to make the accumulation periods coincide in center position. Consequently, image signal outputs of different colors are caused to coincide in magnitude, thereby reducing color bleeding when a moving object is photographed.

However, with the conventional technique, because intervals of image signal outputs are identical among different colors, if image signal output intervals are extended to increase outputs of blue and red pixels lower in sensitivity than green pixels, the image signal output intervals are extended not only for the blue and red pixels, but also for the green pixels higher in sensitivity. This poses a problem in that a resolution deteriorates in a time direction, making blurring conspicuous on moving images.

The present invention has been made in view of the above problem and has an object to provide a setup for keeping a resolution of color motion imaging at a high level in a time direction and thereby improving quality of moving images.

SUMMARY OF THE INVENTION

According to an aspect of the present invention, a driving method of a solid-state imaging apparatus comprises: a pixel unit having a first pixel having a sensitivity such that the sensitivity of the first pixel in a first wavelength band is higher than the sensitivities of the first pixel in second and third wavelength bands, a second pixel having a sensitivity such that the sensitivity of the second pixel in the second wavelength band is higher than the sensitivities of the second pixel in first and third wavelength bands, and a third pixel having a sensitivity such that the sensitivity of the third pixel in the third wavelength band is higher than the sensitivities of the third pixel in first and second wavelength bands, wherein each of the first, second and third pixels outputs an image signal based on light, in a image generated by image signals output from the first, second, third pixels, a contribution of luminance of the first pixel is higher than a contribution to luminance of the second pixel and a contribution to luminance of the third pixel, and wherein an image signal output interval of the first pixel is shorter than image signal output intervals of the second and third pixels.

According to a still further aspect of the present invention, a driving method of a solid-state imaging apparatus comprises: a pixel unit having a first pixel having a sensitivity such that the sensitivity of the first pixel in a first wavelength band is higher than the sensitivities of the first pixel in second and third wavelength bands, a second pixel having a sensitivity such that the sensitivity of the second pixel in the second wavelength band is higher than the sensitivities of the second pixel in first and third wavelength bands, a third pixel having a sensitivity such that the sensitivity of the third pixel in the third wavelength band is higher than the sensitivities of the third pixel in first and second wavelength bands, and a fourth pixel having a sensitivity to a light higher than sensitivities to the light of the first, second and the third pixels, and an image signal output interval of the fourth pixel is shorter than image signal output intervals of the first, second and the third pixels.

According to an another aspect of the present invention, a solid-state imaging apparatus comprises: a pixel unit having a first pixel having a sensitivity such that the sensitivity of the first pixel in a first wavelength band is higher than the sensitivities of the first pixel in second and third wavelength bands, a second pixel having a sensitivity such that the sensitivity of the second pixel in the second wavelength band is higher than the sensitivities of the second pixel in first and third wavelength bands, and a third pixel having a sensitivity such that the sensitivity of the third pixel in the third wavelength band is higher than the sensitivities of the third pixel in first and second wavelength bands; and a control unit configured to control the pixel unit to output an image signal such that an image signal output interval of the first pixel is shorter than image signal output intervals of the second and third pixels, wherein each of the first, second and third pixels outputs an image signal based on light, in a image generated by image signals output from the first, second and third pixels, a contribution of luminance of the first pixel is higher than a contribution to luminance of the second pixel and a contribution to luminance of the third pixel.

According to a still another aspect of the present invention, the present invention comprises a solid-state imaging apparatus; and a signal processing unit configured to process an image signal output from the solid-state imaging apparatus.

Further features of the present invention will become apparent from the following description of exemplary embodiments with reference to the attached drawings.

BRIEF DESCRIPTION OF THE DRAWINGS

FIG. 4B is a diagram showing an exemplary timing chart of a second period P2 for components of the solid-state imaging apparatus according to the first embodiment of the present invention.

FIGS. 5A, 5B and 5C are diagrams showing an example of image signals of pixels in six rows beginning with the 4k-th row in the first period P1 and second period P2 in the first embodiment of the present invention.

FIGS. 7A, 7B and 7C are diagrams showing an example of image signals of pixels in six rows beginning with the 6k-th row in a first period P1 to a third period P3 in the second embodiment of the present invention.

FIG. 11 is a diagram showing an exemplary image signal output sequence of a solid-state imaging apparatus according to a fourth embodiment of the present invention.

FIGS. 12A, 12B and 12C are diagrams showing an example of image signals of pixels in six rows beginning with the 6k-th row in a first period P1 to a third period P3 in the fourth embodiment of the present invention.

FIGS. 14A, 14B and 14C are diagrams showing an example of image signals of pixels in six rows beginning with the 6k-th row in a first period P1 and second period P2 in the fifth embodiment of the present invention.

DESCRIPTION OF THE EMBODIMENTS

Preferred Embodiments of the Present Invention will now be described in detail in accordance with the accompanying drawings.

Embodiment of the present invention will be described below with reference to the accompanying drawings.

First Embodiment

To begin with, a first embodiment of the present invention will be described.

Figure 1:
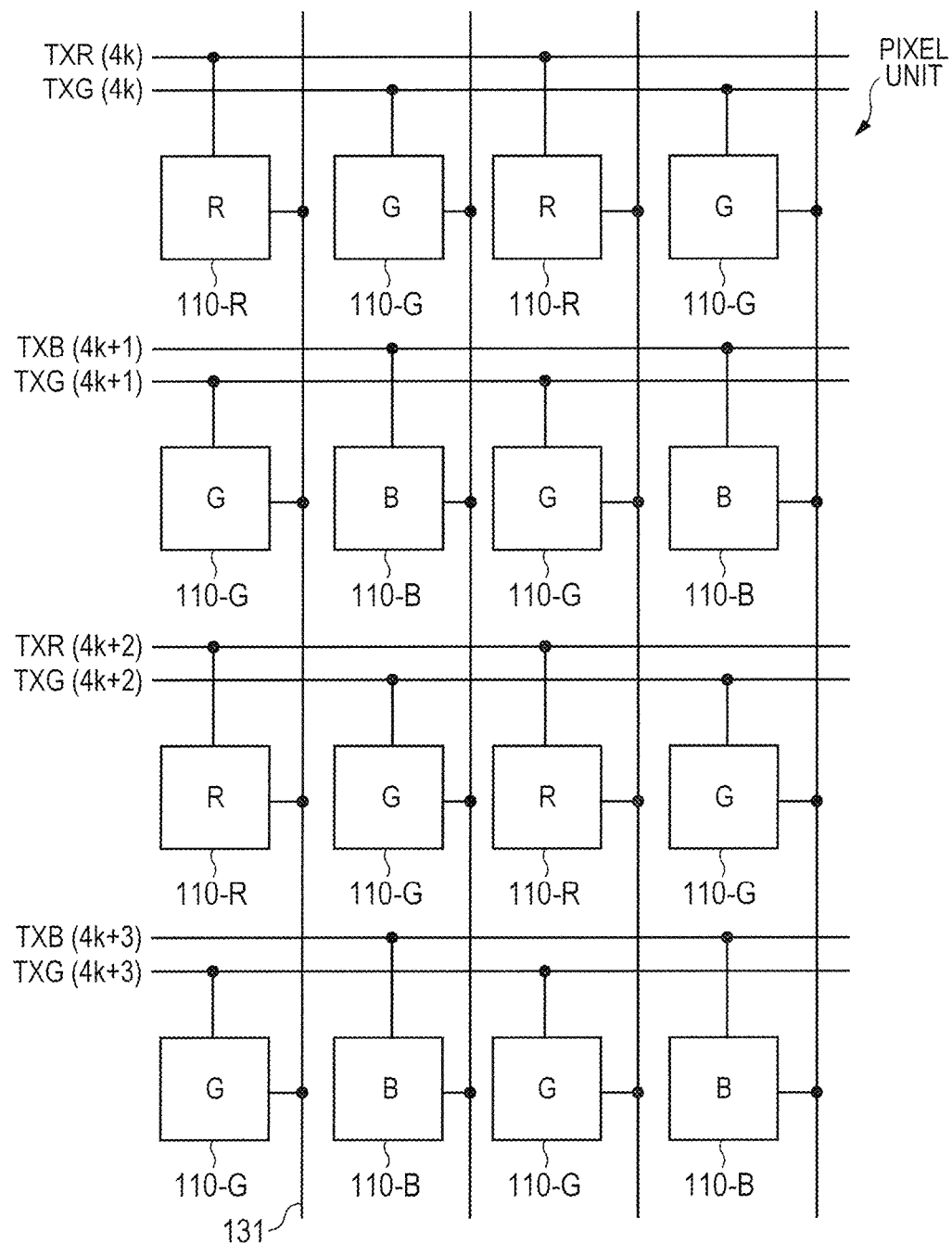
FIG. 1 is a diagram showing an exemplary schematic configuration of a pixel unit alone of a solid-state imaging apparatus according to a first embodiment of the present invention.

FIG. 1 is a diagram showing an exemplary schematic configuration of a pixel unit alone of a solid-state imaging apparatus according to the first embodiment of the present invention. Note that although pixels 110 disposed so as to make up a 4-row by 4-column matrix are shown in FIG. 1 for simplicity's sake, actually a larger number of pixels 110 are disposed, making up larger numbers of rows and columns.

A pixel unit shown in FIG. 1 includes at least a G-pixel group (first pixel group) made up of plural G-pixels 110-G (first pixels), an R-pixel group (second pixel group) made up of plural R-pixels 110-R (second pixels), and a B-pixel group (third pixel group) made up of plural B-pixels 110-B (third pixels), where with respect to light having a wavelength band (first wavelength band) near a green color, a wavelength band (second wavelength band) near a red color, and a wavelength band (third wavelength band) near a blue color, the G-pixels 110-G are higher in sensitivity to the wavelength band near the green color than both to the wavelength band near the red color and wavelength band near the blue color, the R-pixels 110-R are higher in sensitivity to the wavelength band near the red color than both to the wavelength band near the green color and wavelength band near the blue color, and the B-pixels 110-B are higher in sensitivity to the wavelength band near the blue color than both to the wavelength band near the green color and wavelength band near the red color. In FIG. 1, the G-pixels 110-G, R-pixels 110-R and B-pixels 110-B are denoted by "G," "R" and "B," respectively. According to the present embodiment, a set of G-pixels 110-G, an R-pixel 110-R and a B-pixel 110-B are disposed so as to make up a 2-row by 2-column matrix, and the 2-row by 2-column matrices are disposed repeatedly. Driving of the G-pixels 110-G is controlled via a control line TXG, driving of the R-pixels 110-R is controlled via a control line TXR, and driving of the B-pixels 110-B is controlled via a control line TXB. Also, image signals from the pixels 110 are output via signal lines (column signal lines) 131.

Figure 2:
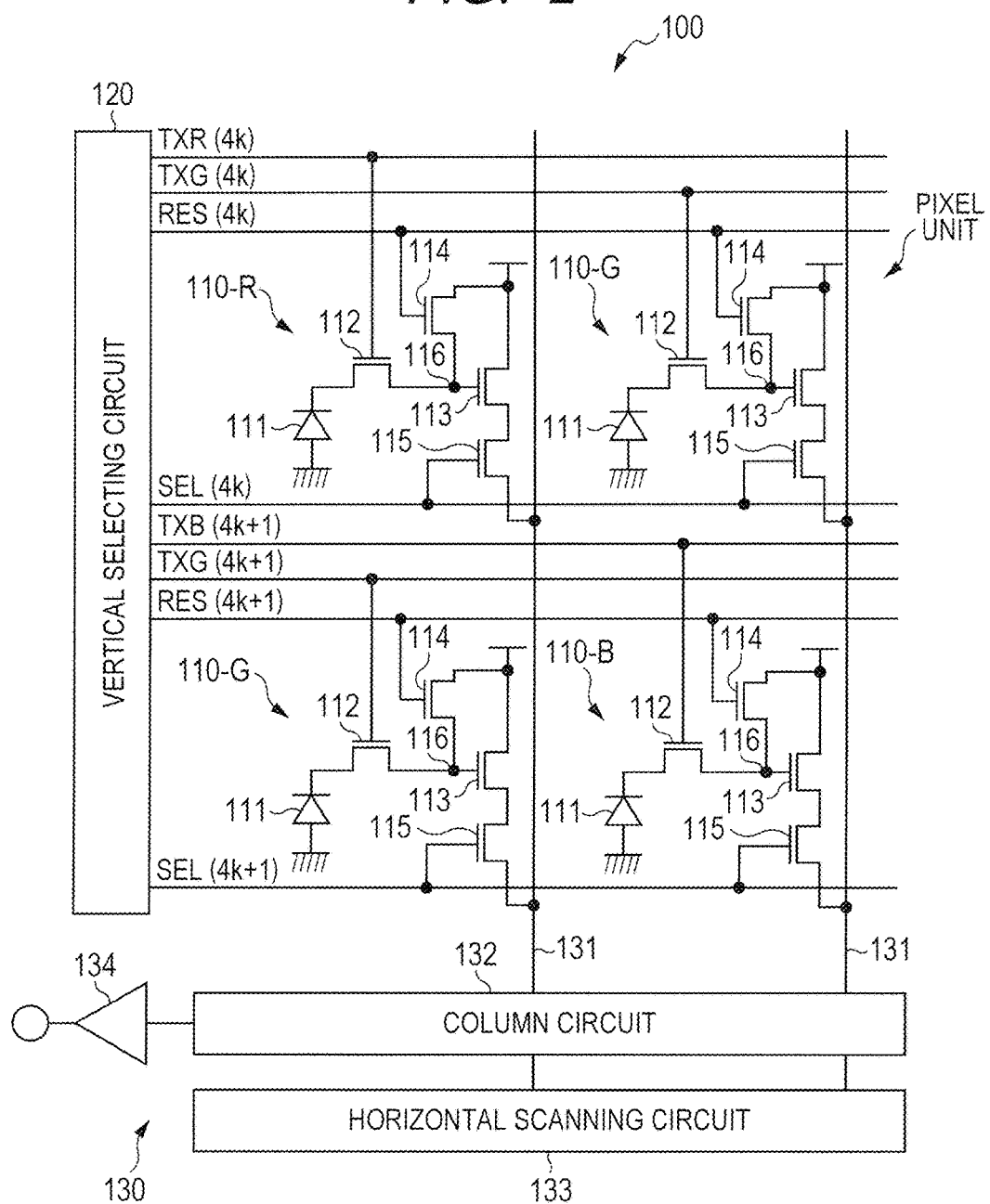
FIG. 2 is a diagram showing an exemplary circuit configuration of the solid-state imaging apparatus according to the first embodiment of the present invention.

FIG. 2 is a diagram showing an exemplary circuit configuration of the solid-state imaging apparatus 100 according to the first embodiment of the present invention. In FIG. 2, components similar to those in FIG. 1 are denoted by the same reference numerals as the corresponding components in FIG. 1.

As shown in FIG. 2, the solid-state imaging apparatus 100 includes a pixel unit in which plural pixels 110 are disposed in a matrix, a vertical selecting circuit 120 and an output unit 130. Also, the output unit 130 includes signal lines (column signal lines) 131, a column circuit 132, a horizontal scanning circuit 133 and an output amplifier 134. Note that, of the plural pixels 110 making up the pixel unit shown in FIG. 1, only 2 rows by 2 columns of pixels 110 located on the upper left are illustrated in the pixel unit of FIG. 2.

According to the present embodiment, pixels 110 are driven by drive signals output by the vertical selecting circuit 120, and image signals (pixel signals) of the respective pixels 110 are read to the signal lines 131. That is, in the present embodiment, the vertical selecting circuit 120 is a control unit which controls driving of each pixel 110.

Each pixel 110 (R-pixel 110-R, G-pixel 110-G, B-pixel 110-B) includes a photoelectric conversion portion 111, a transfer transistor 112, an amplifier transistor 113 and a floating diffusion unit (FD unit) 116. Besides, each pixel 110 (R-pixel 110-R, G-pixel 110-G, B-pixel 110-B) may further include a reset transistor 114 and a selection transistor 115.

The photoelectric conversion portion 111 includes, for example, a photodiode, photoelectrically converts incident light, and accumulates a resulting charge. Note that the charge generated by the photoelectric conversion portion 111 may be held by a charge holding unit disposed between the photoelectric conversion portion 111 and FD unit 116.

The transfer transistor 112 transfers the charge accumulated in the photoelectric conversion portion 111 to the FD unit 116. Electric potential of the FD unit 116 changes with an amount of charge transferred to the FD unit 116.

The amplifier transistor 113 makes up a source follower (SF) circuit, amplifies a signal of the FD unit 116, and outputs the amplified signal as an image signal (pixel signal) to the signal line 131.

The reset transistor 114 resets the electric potential of the FD unit 116 to a reset voltage supplied via a power line.

The selection transistor 115 is provided to set the pixel 110 to which the selection transistor 115 belongs to a selected state or non-selected state.

The vertical selecting circuit 120 selects pixels 110 on a row by row basis and causes the selected pixels 110 to output image signals (pixel signals). The vertical selecting circuit 120 is electrically connected to the pixels 110 via the control lines TXR, TXG, TXB, RES and SEL.

The control line TXR is intended for the transfer transistors 112 of the R-pixels 110-R, and the control line TXG is intended for the transfer transistors 112 of the G-pixels 110-G, and the control line TXB is intended for the transfer transistors 112 of the B-pixels 110-B. In the example shown in FIG. 2, the control line TXG is provided for every row of pixels 110 while the control lines TXR and TXB are provided for every second row of pixels 110.

Also, in the example shown in FIG. 2, a G-pixel 110-G and R-pixel 110-R belong to a same row and a G-pixel 110-G and B-pixel 110-B belong to a same row. Therefore, using the separate control lines TXG, TXR, TXB for the G-pixels 110-G, R-pixels 110-R and B-pixels 110-B, the vertical selecting circuit 120 controls the charge accumulation periods and charge transfer processing of the pixels 110 belonging to the same row and differing in color independently among the different-colored pixels 110. Also, the control line RES is intended for the reset transistors 114 and the control line SEL is intended for the selection transistors 115, and the control lines RES and SEL are provided in every row of pixels 110.

The column circuit 132 reads and holds image signals output to each signal line 131. The column circuit 132 may contain a circuit adapted to take differences between the image signals output to the signal lines 131 and noise signals and cancel out the noise, a circuit adapted to amplify signals, and a circuit adapted to hold the amplified signals.

The horizontal scanning circuit 133 scans the column circuit 132 from one column of pixels 110 to another. As a result of the scanning process performed by the horizontal scanning circuit 133, the image signals held in the column circuit 132 are output to the output amplifier 134.

The output amplifier 134 amplifies the plural image signals (pixel signals) and outputs the amplified image signals from the solid-state imaging apparatus 100 in sequence.

Figure 3:
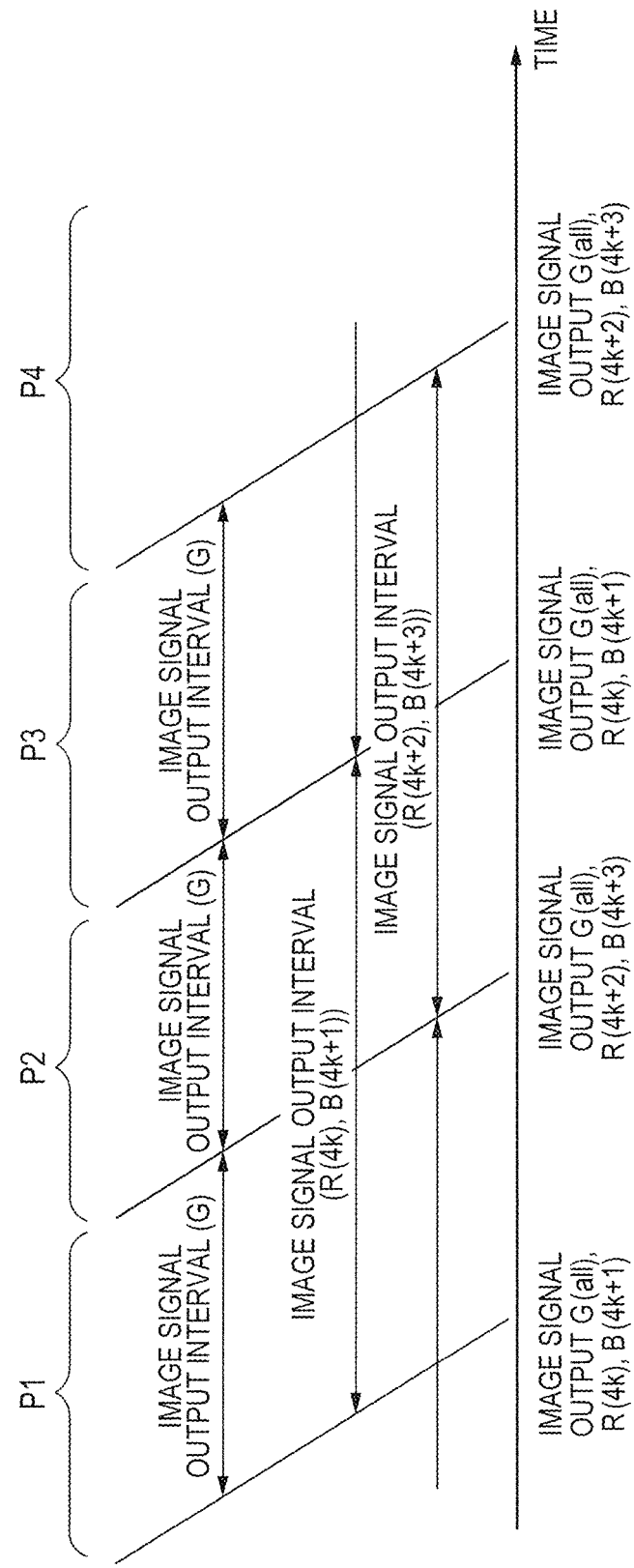
FIG. 3 is a diagram showing an exemplary image signal output sequence of the solid-state imaging apparatus according to the first embodiment of the present invention.

FIG. 3 is a diagram showing an exemplary image signal output sequence of the solid-state imaging apparatus 100 according to the first embodiment of the present invention. In FIG. 3, the slant lines indicate read start times of rows of pixels 110, and higher-numbered rows are read as the slant lines go downward.

In the example shown in FIG. 3, in a first period P1, the output unit 130 outputs the image signals of all the G-pixels 110-G on a row by row basis in sequence (output image signal G(all) in FIG. 3). Regarding image signals of R-pixels 110-R, the output unit 130 outputs every fourth row beginning with the first row in which R-pixels 110-R exist (output image signal R(4k) in FIG. 3). As shown in FIG. 1, since R-pixels 110-R exist as a pixel array only every second row, if only the R-pixels 110-R are noted, the output unit 130 outputs the image signals of R-pixels 110-R at a rate of one in every two rows. Regarding image signals of B-pixels 110-B, the output unit 130 outputs every fourth row beginning with the row next to the first row in which B-pixels 110-B exist (output image signal B(4k+1) in FIG. 3). Consequently, as with the R-pixels 110-R, the output unit 130 outputs the image signals of B-pixels 110-B at a rate of one in every two rows.

Also, in the example shown in FIG. 3, in a second period P2 different from the first period P1, the output unit 130 outputs the image signals of all the G-pixels 110-G on a row by row basis in sequence (output image signal G(all) in FIG. 3). Regarding the image signals of R-pixels 110-R, the output unit 130 outputs every fourth row beginning with the second row after the first row in which R-pixels 110-R exist (output image signal R(4k+2) in FIG. 3). As shown in FIG. 1, since R-pixels 110-R exist as a pixel array only every second row, if only the R-pixels 110-R are noted, the output unit 130 outputs the image signals of the R-pixels 110-R not output in the first period P1, at a rate of one in every two rows. Regarding the image signals of B-pixels 110-B, the output unit 130 outputs every fourth row beginning with the third row after the first row in which B-pixels 110-B exist (output image signal B(4k+3) in FIG. 3). Consequently, as with the R-pixels 110-R, the output unit 130 outputs the image signals of the R-pixels 110-R not output in the first period P1, at a rate of one in every two rows.

Subsequently, an image signal output process of a third period P3 is the same as the image signal output process of the first period P1 while an image signal output process of a fourth period P4 is the same as the image signal output process of the second period P2. In this way, by repeating the image signal output process of the first period P1 and image signal output process of the second period P2, the output unit 130 outputs the image signals in such a way that the image signal output interval of the G-pixel group will be shorter than the image signal output intervals of the R-pixel group and B-pixel group.

That is, in the example shown in FIG. 3, the output unit 130 performs the image signal output process described below.

Contribution of light in a image generated by image signals output from the pixels, in a wavelength band near a green color to luminance being higher than those of light in a wavelength band near a red color and light in a wavelength band near a blue color, the output unit 130 outputs the image signals in such a way that the image signal output interval of the G-pixel group at which the light in the wavelength band near the green color is detected will be shorter than the image signal output interval of the R-pixel group at which the light in the wavelength band near the red color is detected and the image signal output interval of the B-pixel group at which the light in the wavelength band near the blue color is detected.

Also, in the first period P1, the output unit 130 outputs the image signals of the G-pixel group as well as the image signals of part of the R-pixel group and B-pixel group. Also, in the second period P2 different from the first period P1, the output unit 130 outputs the image signals of the G-pixel group as well as that part of the image signals of the R-pixel group and B-pixel group which is not output in the first period P1. In so doing, in the example shown in FIG. 3, the output unit 130 outputs the image signals of the R-pixel group and B-pixel group at a rate of one in every two rows.

Next, timing charts of the solid-state imaging apparatus 100 in the first period P1 and second period P2 shown in FIG. 3 will be described with reference to FIGS. 4A and 4B, respectively.

First, the timing chart of the solid-state imaging apparatus 100 in the first period P1 shown in FIG. 3 will be described with reference to FIG. 4A.

Figure 4A:
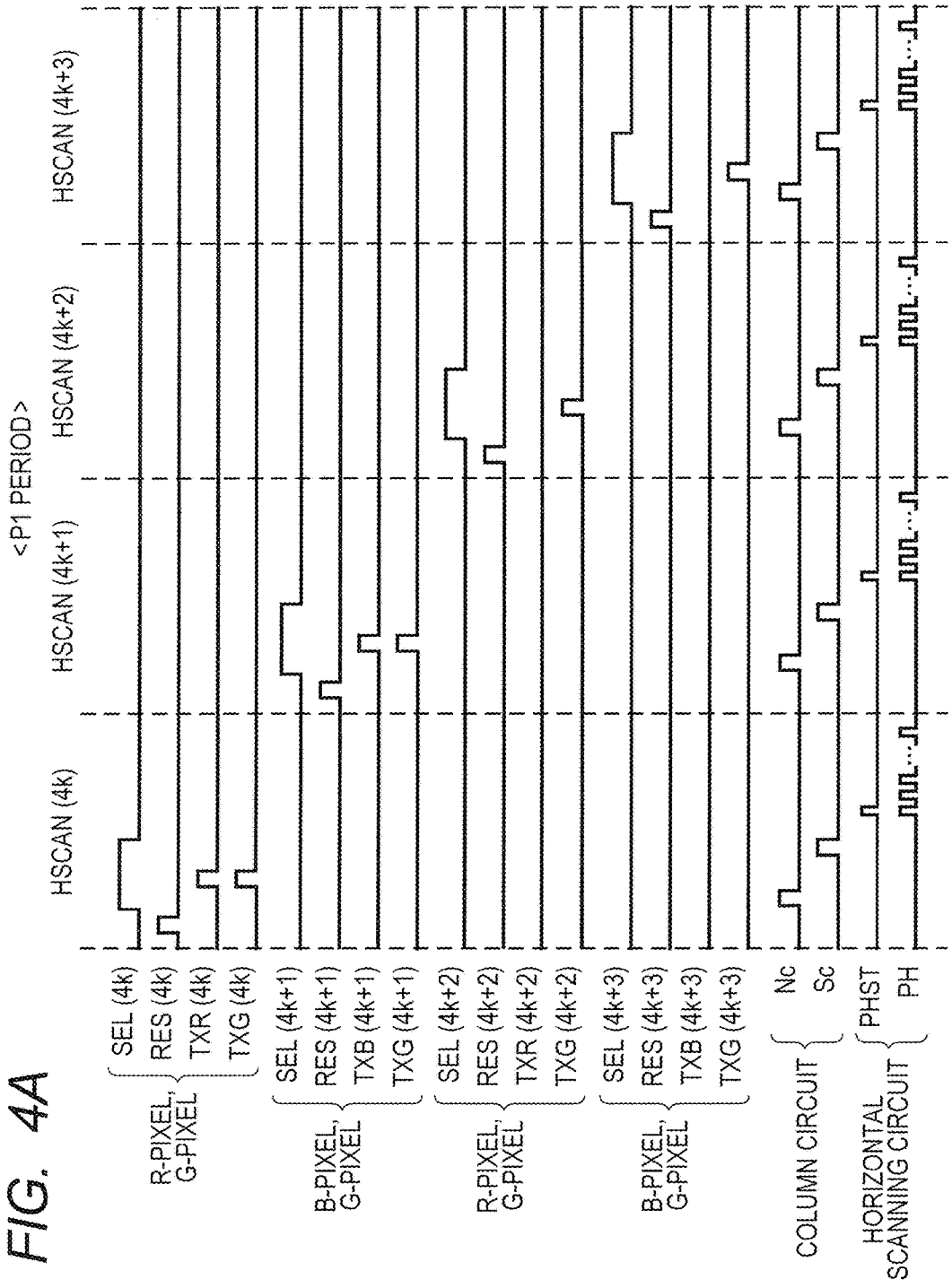
FIG. 4A is a diagram showing an exemplary timing chart of a first period P1 for components of the solid-state imaging apparatus according to the first embodiment of the present invention.

FIG. 4A is a diagram showing an exemplary timing chart of a first period P1 for components of the solid-state imaging apparatus 100 according to the first embodiment of the present invention. Specifically, FIG. 4A shows an exemplary timing chart of signal processing for pixels 110 in the 4k-th row to (4k+3)-th row in the first period P1.

First, signal processing for the pixels 110 in the 4k-th row will be described.

First, the vertical selecting circuit 120 sets the control line RES (4k) for the 4k-th row to Hi. Consequently, the reset transistors 114 for the 4k-th row turn on, thereby resetting the FD units 116 of the R-pixels 110-R and G-pixels 110-G in the 4k-th row. Next, the vertical selecting circuit 120 sets the control line RES (4k) to Low, thereby turning off the reset transistors 114. Next, the vertical selecting circuit 120 sets the control line SEL (4k) to Hi. This turns on the selection transistors 115 for the R-pixels 110-R and G-pixels 110-G in the 4k-th row, thereby selecting the R-pixels 110-R and G-pixels 110-G in the 4k-th row. Next, for example, the vertical selecting circuit 120 sets a signal line Nc for controlling the column circuit 132 to Hi. Consequently, reset voltages N corresponding to reset levels of the respective FD units 116 of the R-pixels 110-R and G-pixels 110-G in the 4k-th row are held in a reset voltage holding unit of the column circuit 132. Next, the vertical selecting circuit 120 sets the control line TXR (4k) and control line TXG (4k) to Hi, thereby causing charges of the R-pixels 110-R and G-pixels 110-G in the 4k-th row to be transferred to the FD units 116. Next, for example, the vertical selecting circuit 120 sets the control line Sc for controlling the column circuit 132 to Hi. Consequently, image signal voltages S corresponding to amounts of the charges transferred to the respective FD units 116 of the R-pixels 110-R and G-pixels 110-G in the 4k-th row are held in a signal holding unit of the column circuit 132. The time at which this takes place will be designated as an image signal output time. Next, PHST is set to Hi, causing the horizontal scanning circuit 133 to start scanning. Then, each time PH is set to Hi, plural columns of pixels 110 in the 4k-th row are selected in sequence, thereby outputting the pixel signals of the pixels 110 (R-pixels 110-R and G-pixels 110-G) in the 4k-th row in sequence via the output amplifier 134. In so doing, the output amplifier 134 may output signals obtained by amplifying differences (S–N) between the image signals S and reset signal N or the column circuit 132 may supply the differences (S–N) between the image signals S and reset signal N to the output amplifier 134.

Subsequent signal processing for the pixels 110 in the (4k+1)-th row is similar to the processing for the 4k-th row except that the pixel array is changed from the R-pixels 110-R and G-pixels 110-G in the 4k-th row to G-pixels 110-G and B-pixels 110-B and that the control line TXR is changed to the control line TXB.

Next, signal processing for the pixels 110 in the (4k+2)-th row will be described.

First, the vertical selecting circuit 120 sets the control line RES (4k+2) for the (4k+2)-th row to Hi. Consequently, the reset transistors 114 for the (4k+2)-th row turn on, thereby resetting the FD units 116 of the R-pixels 110-R and G-pixels 110-G in the (4k+2)-th row. Next, the vertical selecting circuit 120 sets the control line RES (4k+2) to Low, thereby turning off the reset transistors 114. Next, the vertical selecting circuit 120 sets the control line SEL (4k+2) to Hi. Consequently, the selection transistors 115 for the R-pixels 110-R and G-pixels 110-G in the (4k+2)-th row turn on, thereby selecting the R-pixels 110-R and G-pixels 110-G in the (4k+2)-th row. Next, for example, the vertical selecting circuit 120 sets a signal line Nc for controlling the column circuit 132 to Hi. Consequently, reset voltages N corresponding to reset levels of the respective FD units 116 of the R-pixels 110-R and G-pixels 110-G in the (4k+2)-th row are held in the reset voltage holding unit of the column circuit 132. Next, the vertical selecting circuit 120 sets the control line TXR (4k+2) to Hi, thereby causing the charges of the G-pixels 110-G in the (4k+2)-th row to be transferred to the FD units 116. In so doing, the control line TXR (4k+2) remains Low, and thus the charges of the R-pixels 110-R in the (4k+2)-th row are not transferred to the FD units 116. That is, the R-pixels 110-R continue to accumulate charges. Next, for example, the vertical selecting circuit 120 sets the control line Sc for controlling the column circuit 132 to Hi. Consequently, image signal voltages S corresponding to the amounts of charges transferred to the FD units 116 of the G-pixels 110-G are held in the signal holding unit of the column circuit 132. At this time, a reset signal N (hereinafter referred to as a "dummy signal") corresponding to the reset level of the FD units 116 of the R-pixels 110-R is held in the signal holding unit of the column circuit 132. Next, PHST is set to Hi, causing the horizontal scanning circuit 133 to start scanning. Then, each time PH is set to Hi, plural columns of pixels 110 in the (4k+2)-th row are selected in sequence, thereby outputting the image signals of the G-pixels 110-G and dummy signals of the R-pixels 110-R in the (4k+2)-th row in sequence via the output amplifier 134. In so doing, the horizontal scanning circuit 133 may carry out scanning by skipping the dummy signals of the R-pixels 110-R and thereby output only the image signals of the G-pixels 110-G via the output amplifier 134. This will allow image signal read speed to be increased.

Subsequent signal processing for the pixels 110 in the (4k+3)-th row is similar to the processing for the (4k+2)-th row except that the pixel array is changed from the R-pixels 110-R and G-pixels 110-G in the (4k+2)-th row to G-pixels 110-G and B-pixels 110-B and that the control line TXR is changed to the control line TXB.

Subsequent signal processing involves repetitions of actions in the 4k-th row to the (4k+3)-th row described above.

Next, the timing chart of the solid-state imaging apparatus 100 in the second period P2 shown in FIG. 3 will be described with reference to FIG. 4B.

FIG. 4B is a diagram showing an exemplary timing chart of the second period P2 for components of the solid-state imaging apparatus 100 according to the first embodiment of the present invention. Specifically, FIG. 4B shows an exemplary timing chart of signal processing for the pixels 110 in the 4k-th row to (4k+3)-th row in the second period P2.

Signal processing for the pixels 110 in the 4k-th row in the second period P2 is the same as the signal processing for the pixels 110 in the (4k+2)-th row in the first period P1 described above. Therefore, the pixel signals of the G-pixels 110-G and the dummy signals of the R-pixels 110-R in the 4k-th row are held in the signal holding unit of the column circuit 132 and output via the output amplifier 134 as a result of scanning by the horizontal scanning circuit 133. The image signal output time of the G-pixels 110-G is the time at which the control line Sc becomes Hi. The image signal output time is irrelevant to the R-pixels 110-R, for which the dummy signals are used.

Signal processing for the pixels 110 in the (4k+1)-th row in the second period P2 is the same as the signal processing for the pixels 110 in the (4k+3)-th row in the first period P1 described above. Therefore, the image signals of the G-pixels 110-G and the dummy signals of the B-pixels 110-B in the (4k+1)-th row are held in the signal holding unit of the column circuit 132 and output via the output amplifier 134 as a result of scanning by the horizontal scanning circuit 133.

Signal processing for the pixels 110 in the (4k+2)-th row in the second period P2 is the same as the signal processing for the pixels 110 in the 4k-th row in the first period P1 described above. Therefore, the image signals of the G-pixels 110-G and the image signals of the R-pixels 110-R in the (4k+2)-th row are held in the signal holding unit of the column circuit 132 and output via the output amplifier 134 as a result of scanning by the horizontal scanning circuit 133.

Signal processing for the pixels 110 in the (4k+3)-th row in the second period P2 is the same as the signal processing for the pixels 110 in the (4k+1)-th row in the first period P1 described above. Therefore, the image signals of the G-pixels 110-G and the image signals of B-pixels 110-B in the (4k+3)-th row are held in the signal holding unit of the column circuit 132 and output via the output amplifier 134 as a result of scanning by the horizontal scanning circuit 133.

Subsequent signal processing involves repetitions of actions in the 4k-th row to the (4k+3)-th row described above.

From FIGS. 4A and 4B, the image signal output interval of the G-pixels 110-G corresponds to the interval between the image signal output time in the first period P1 and image signal output time in the second period P2. On the other hand, the image signal output intervals of the R-pixels 110-R (4k) and B-pixels 110-B (4k+1) correspond to the interval between the image signal output time in the first period P1 and image signal output time in the third period P3. Also, the image signal output intervals of the R-pixels 110-R (4k+2) and B-pixels 110-B (4k+3) correspond to the interval between the image signal output time in the second period P2 and the image signal output time in the fourth period P4.

Therefore, the image signal output interval of the G-pixel group is ½ the image signal output interval of the R-pixel group and B-pixel group. According to the present embodiment, since the charge accumulation period of each pixel 110 is equal to the image signal output interval, the charge accumulation periods of the R-pixel group and B-pixel group are twice the charge accumulation period of the G-pixel group, improving the SN ratio and sensitivity of the R-pixel group and B-pixel group accordingly at the time of image signal output. In other words, according to the present embodiment, under the control of the vertical selecting circuit 120, the charge accumulation period of the G-pixel group is made shorter than the charge accumulation periods of the R-pixel group and B-pixel group. In this way, the vertical selecting circuit 120 controls the charge accumulation periods of the G-pixel group, R-pixel group and B-pixel group independently of one another.

Figures 5A, 5B, 5C:
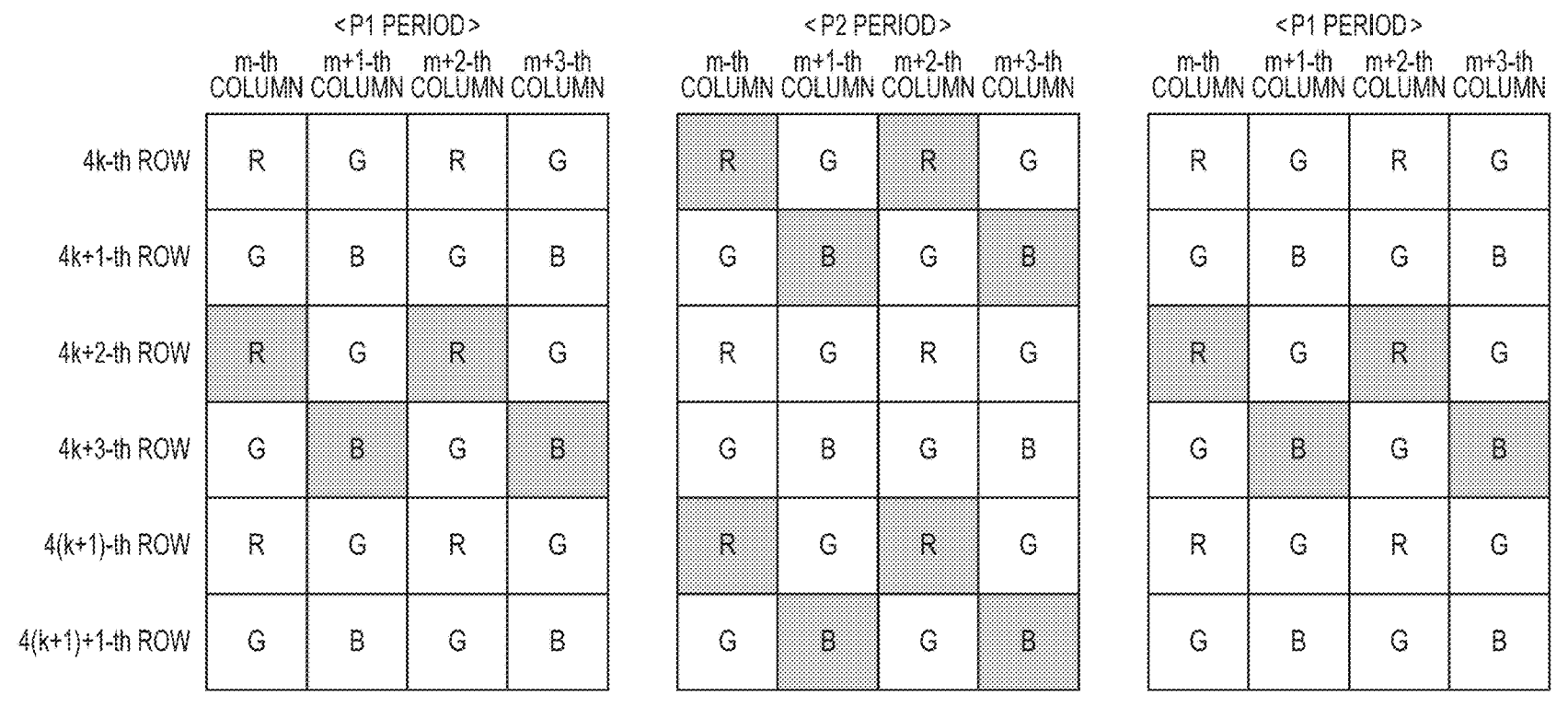

FIGS. 5A to 5C are diagrams showing an example of image signals of the pixels 110 in six rows beginning with the 4k-th row in the first period P1 and second period P2 in the first embodiment of the present invention. Specifically, FIGS. 5A and 5C show an example of image signals of the pixels 110 in the six rows beginning with the 4k-th row in the first period P1 while FIG. 5B shows an example of image signals of the pixels 110 in the six rows beginning with the 4k-th row in the second period P2.

In FIGS. 5A to 5C, of the R-pixels 110-R and B-pixels 110-B, the gray-shaded pixels are those which output dummy signals. In this way, according to the present embodiment, some of R-pixels 110-R and B-pixels 110-B in a same period lack image signals. To deal with this, the lacking image signals may be interpolated using the image signals of the R-pixels 110-R and B-pixels 110-B of the preceding and succeeding rows in the same period or the image signals of the R-pixels 110-R and B-pixels 110-B of the same row in the preceding period. Alternatively, interpolation may be performed using both the image signals of the same row in the preceding period and the image signals of the preceding and succeeding rows in the same period described above.

As described above, according to the first embodiment, contribution of light in a image generated by image signals output from the pixels, in a wavelength band near a green color to luminance being higher than those of light in a wavelength band near a red color and light in a wavelength band near a blue color, the image signals are output in such a way that the image signal output intervals of the G-pixel group at which the light in the wavelength band near the green color is detected will be shorter than the image signal output intervals of the R-pixel group at which the light in the wavelength band near the red color is detected and the image signal output intervals of the B-pixel group at which the light in the wavelength band near the blue color is detected.

With this configuration, while improving the SN ratio and sensitivity by increasing the image signal output intervals of the R-pixel group and B-pixel group, a resolution of color motion imaging in a time direction can be improved by reducing the image signal output interval of the G-pixel group which carries luminance information. That is, the first embodiment can keep a resolution of color motion imaging at a high level in the time direction and thereby improve quality of moving images.

Variation of First Embodiment

Note that the first embodiment has been described by citing an aspect of the solid-state imaging apparatus 100 containing, as a pixel unit, at least an R-pixel group, G-pixel group and B-pixel group with R, G and B color filters disposed thereon, respectively. However, the first embodiment is not limited to this aspect. For example, the first embodiment can also include an aspect in which the solid-state imaging apparatus 100 contains, as a pixel unit, at least a cyan pixel group, yellow pixel group, green pixel group and magenta pixel group with cyan (C), yellow (Y), green (G) and magenta (Mg) color filters disposed thereon, respectively. In this aspect, the output unit 130 produces outputs, for example, by setting the image signal output intervals of the cyan pixel group, green pixel group and yellow pixel group shorter than the image signal output interval of the magenta pixel group. Note that this aspect is applicable to the present invention as long as the image signal output interval of at least one of the cyan pixel group, green pixel group and yellow pixel group is shorter than the image signal output interval of the magenta pixel group.

Second Embodiment

Next, a second embodiment of the present invention will be described.

A schematic configuration of a pixel unit of a solid-state imaging apparatus according to the second embodiment is similar to the schematic configuration of the pixel unit of the solid-state imaging apparatus according to the first embodiment shown in FIG. 1. Also, a circuit configuration of the solid-state imaging apparatus according to the second embodiment is similar to the circuit configuration of the solid-state imaging apparatus 100 according to the first embodiment shown in FIG. 2.

Figure 6:
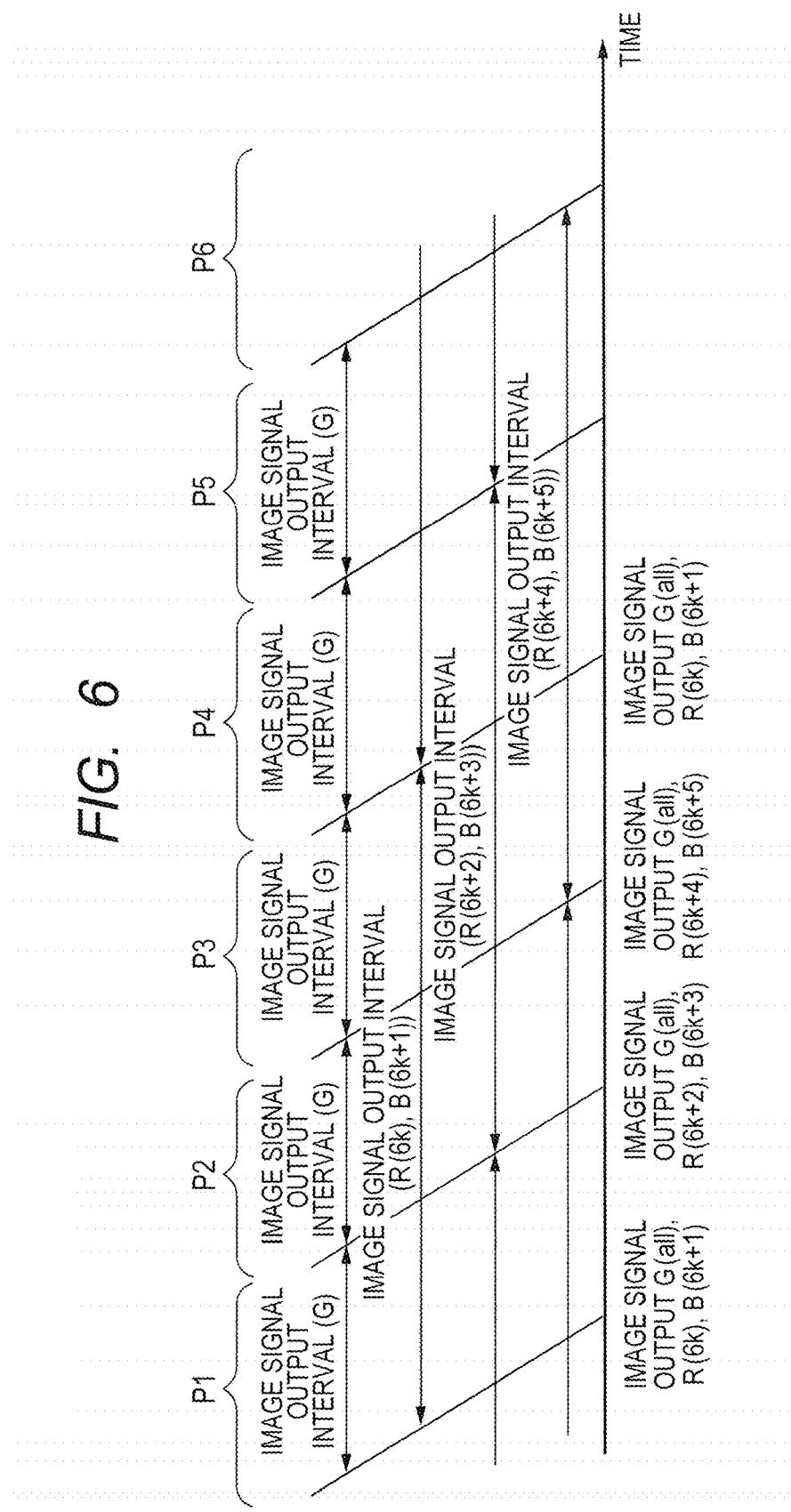
FIG. 6 is a diagram showing an exemplary image signal output sequence of a solid-state imaging apparatus according to a second embodiment of the present invention.

FIG. 6 is a diagram showing an exemplary image signal output sequence of the solid-state imaging apparatus 100 according to the second embodiment of the present invention. In FIG. 6, the slant lines indicate read start times of rows of pixels 110, and higher-numbered rows are read as the slant lines go downward.

In the example shown in FIG. 6, in a first period P1, the output unit 130 outputs the image signals of all the G-pixels 110-G on a row by row basis in sequence (output image signal G(all) in FIG. 6). Regarding the image signals of R-pixels 110-R, the output unit 130 outputs every sixth row beginning with the first row in which R-pixels 110-R exist (output image signal R(6k) in FIG. 6). As shown in FIG. 1, since R-pixels 110-R exist as a pixel array only every second row, if only the R-pixels 110-R are noted, the output unit 130 outputs the image signals of R-pixels 110-R at a rate of one in every three rows. Regarding the image signals of B-pixels 110-B, the output unit 130 outputs every sixth row beginning with the row next to the first row in which B-pixels 110-B exist (output image signal B(6k+1) in FIG. 6). Consequently, as with the R-pixels 110-R, the output unit 130 outputs the image signals of B-pixels 110-B at a rate of one in every three rows.

Also, in the example shown in FIG. 6, in a second period P2 different from the first period P1, regarding the image signals of G-pixels 110-G, the output unit 130 outputs the pixel signals of all the pixels on a row by row basis in sequence (output image signal G(all) in FIG. 6) as in the case of the first period P1. Regarding the image signals of R-pixels 110-R, the output unit 130 outputs every sixth row beginning with the second row after the first row in which R-pixels 110-R exist (output image signal R(6k+2) in FIG. 6). As shown in FIG. 1, since R-pixels 110-R exist as a pixel array only every second row, if only the R-pixels 110-R are noted, the output unit 130 outputs the image signals of R-pixels 110-R at a rate of one in every three rows. Regarding the image signals of B-pixels 110-B, the output unit 130 outputs every sixth row beginning with the third row after the first row in which B-pixels 110-B exist (output image signal B(6k+3) in FIG. 6). Consequently, as with the R-pixels 110-R, the output unit 130 outputs the image signals of B-pixels 110-B at a rate of one in every three rows.

Also, in the example shown in FIG. 6, in a third period P3 different from the first period P1 and second period P2, regarding the image signals of G-pixels 110-G, the output unit 130 outputs the pixel signals of all the pixels on a row by row basis in sequence (output image signal G(all) in FIG. 6) as in the case of the first period P1. Regarding the image signals of R-pixels 110-R, the output unit 130 outputs every sixth row beginning with the fourth row after the first row in which R-pixels 110-R exist (output image signal R(6k+4) in FIG. 6). As described above, since R-pixels 110-R exist as a pixel array only every second row, if only the R-pixels 110-R are noted, the output unit 130 outputs the image signals of R-pixels 110-R at a rate of one in every three rows.

Regarding the image signals of B-pixels 110-B, the output unit 130 outputs every sixth row beginning with the fifth row after the first row in which B-pixels 110-B exist (output image signal B(6k+5) in FIG. 6). Consequently, as with the R-pixels 110-R, the output unit 130 outputs the image signals of B-pixels 110-B at a rate of one in every three rows.

Subsequently, the same image signal output process as in the first period P1 described above is performed in the fourth period P4 shown in FIG. 6, the same image signal output process as in the second period P2 is performed in the fifth period P5, and the same image signal output process as in the third period P3 is performed in the sixth P6 period. In this way, by repeating the image signal output processes of the first period P1 to the third period P3, the output unit 130 outputs the image signals in such a way that the image signal output interval of the G-pixel group will be shorter than the image signal output intervals of the R-pixel group and B-pixel group. In so doing, in the example shown in FIG. 6, the output unit 130 outputs the image signals of the R-pixel group and B-pixel group at a rate of one in every three rows. In other words, the image signal output intervals of the R-pixel group and B-pixel group are set at three times the image signal output interval of the G-pixel group.

FIGS. 7A to 7C are diagrams showing an example of image signals of pixels 110 in six rows beginning with the 6k-th row in a first period P1 to a third period P3 in the second embodiment of the present invention. Specifically, FIG. 7A shows an example of the image signals of the pixels 110 in the six rows beginning with the 6k-th row in the first period P1, FIG. 7B shows an example of the image signals of the pixels 110 in the six rows beginning with the 6k-th row in the second period P2, and FIG. 7C shows an example of the image signals of the pixels 110 in the six rows beginning with the 6k-th row in the third period P3.

In FIGS. 7A to 7C, as with FIGS. 5A to 5C, of the R-pixels 110-R and B-pixels 110-B, the gray-shaded pixels are those which output dummy signals. In this way, according to the present embodiment, some of R-pixels 110-R and B-pixels 110-B in a same period lack image signals. To deal with this, the lacking image signals may be interpolated using the image signals of the R-pixels 110-R and B-pixels 110-B of the preceding and succeeding rows in the same period or the image signals of the R-pixels 110-R and B-pixels 110-B of the same row in the preceding period. Alternatively, interpolation may be performed using both the image signals of the same row in the preceding period and the image signals of the preceding and succeeding rows in the same period described above.

As described above, according to the second embodiment, the image signals are output in such a way that the image signal output interval of the G-pixel group will be shorter than the image signal output intervals of the R-pixel group and B-pixel group. Specifically, the image signal output interval of the G-pixel group is set to be ⅓ the image signal output intervals of the R-pixel group and B-pixel group. In other words, the image signal output intervals of the R-pixel group and B-pixel group are set to be three times the image signal output interval of the G-pixel group.

With this configuration, even when R-pixel and B-pixel output is no more than half the G-pixel output, as the image signal output intervals of the R-pixels and B-pixels are set to be three times the image signal output interval of the G-pixels, the image signal output of the R-pixels and B-pixels can be improved and caused to coincide in magnitude with the G-pixels. Also, by reducing the image signal output interval of the G-pixel group, the resolution of color motion imaging in the time direction can be improved. That is, the second embodiment can keep the resolution of color motion imaging at a high level in the time direction and thereby improve the quality of moving images.

Generalization of First Embodiment and Second Embodiment

In the first embodiment described above, "the image signal of the R-pixel group and B-pixel group are output at a rate of one in every two rows." Also, in the second embodiment described above, "the image signals of the R-pixel group and B-pixel group are output at a rate of one in every three rows." In the present invention, this can be applied in a generalized form as follows. That is, according to the present invention, "the image signals of the R-pixel group and B-pixel group are output at a rate of m in every n rows where m and n are positive integers such that m/n<1."

With this configuration, as the image signal output intervals of the R-pixel group and B-pixel group are set to be n/m or more of the image signal output interval of the G-pixel group (where n/m>1), the image signal output of the R-pixel group and B-pixel group can be improved, and caused to coincide in magnitude with the G-pixel group. Also, by reducing the image signal output interval of the G-pixel group, the resolution of color motion imaging in the time direction can be improved. That is, it is obvious that the configuration in which image signals are output so as to satisfy these conditions can achieve the operation and effects of keeping the resolution of color motion imaging at a high level in the time direction and thereby improving the quality of moving images.

Third Embodiment

Next, a third embodiment of the present invention will be described.

A schematic configuration of a pixel unit of a solid-state imaging apparatus according to the third embodiment is similar to the schematic configuration of the pixel unit of the solid-state imaging apparatus according to the first embodiment shown in FIG. 1. Also, a circuit configuration of the solid-state imaging apparatus according to the third embodiment is similar to the circuit configuration of the solid-state imaging apparatus 100 according to the first embodiment shown in FIG. 2. A difference from the first embodiment lies in that in driving the vertical selecting circuit 120, the act of resetting the charge in the photoelectric conversion portion 111 is performed when a given row is not selected (when the control line SEL is Low and the pixels 110 belonging to the row are not connected to the signal line 131). In the following description of the third embodiments, points different from the first embodiment will be addressed, and matters which concern the third embodiment but are not mentioned below correspond to equivalent matters concerning the first embodiment.

Figure 8:
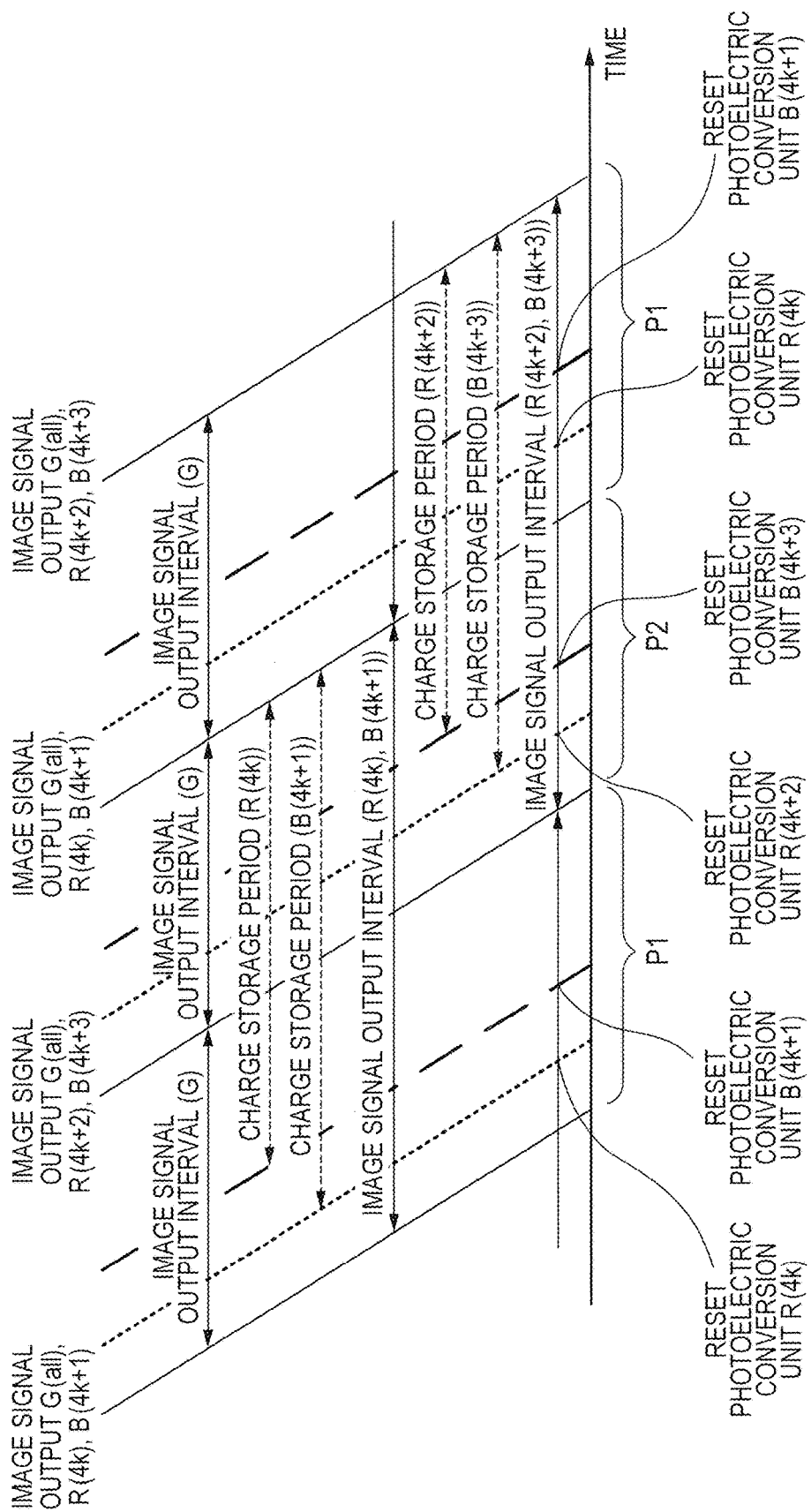
FIG. 8 is a diagram showing an exemplary image signal output sequence of a solid-state imaging apparatus according to a third embodiment of the present invention.

FIG. 8 is a diagram showing an exemplary image signal output sequence of the solid-state imaging apparatus 100 according to the third embodiment of the present invention. In FIG. 8, timings of the image signal outputs in the first period P1 and second period P2 are the same as the first embodiment.

Reset scanning of the photoelectric conversion portions 111 in the first period P1 will be described first.

Regarding the R-pixels 110-R, at a certain stage in the first period P1, the vertical selecting circuit 120 resets the photoelectric conversion portions 111 every four rows beginning with the first row in which R-pixels 110-R exist (reset photoelectric conversion portion R(4k) in FIG. 8). Regarding the B-pixels 110-B, the vertical selecting circuit 120 resets the photoelectric conversion portions 111 independently of the R-pixels 110-R. Specifically, regarding the B-pixels 110-B, at a certain stage in the first period P1, the vertical selecting circuit 120 resets the photoelectric conversion portions 111 every four rows beginning with the row next to the first row in which B-pixels 110-B exist (reset photoelectric conversion portion B(4k+1) in FIG. 8).

Reset scanning of the photoelectric conversion portions 111 in the second period P2 will be described next.

Regarding the R-pixels 110-R, at a certain stage in the second period P2, the vertical selecting circuit 120 resets the photoelectric conversion portions 111 every four rows beginning with the second row after the first row in which R-pixels 110-R exist (reset photoelectric conversion portion R(4k+2) in FIG. 8). Regarding the B-pixels 110-B, the vertical selecting circuit 120 resets the photoelectric conversion portions 111 independently of the R-pixels 110-R. Specifically, regarding the B-pixels 110-B, at a certain stage in the second period P2, the vertical selecting circuit 120 resets the photoelectric conversion portions 111 every four rows beginning with the third row after the first row in which B-pixels 110-B exist (reset photoelectric conversion portion B(4k+3) in FIG. 8).

Subsequently, by repeating the first period P1 and second period P2, the image signal output interval of the G-pixel group can be set shorter than the image signal output intervals of the R-pixel group and B-pixel group, and the charge accumulation periods of the R-pixel group and B-pixel group can be controlled independently of each other. Although not illustrated in FIG. 8, reset scanning of G-pixels 110-G may also be performed by the photoelectric conversion portions 111. In that case, both in the first period P1 and second period P2, all the rows of G-pixels 110-G are scanned at a certain stage beginning with the first row.

Next, a timing chart of the solid-state imaging apparatus 100 in the first period P1 shown in FIG. 8 will be described with reference to FIG. 9.

Figure 9:
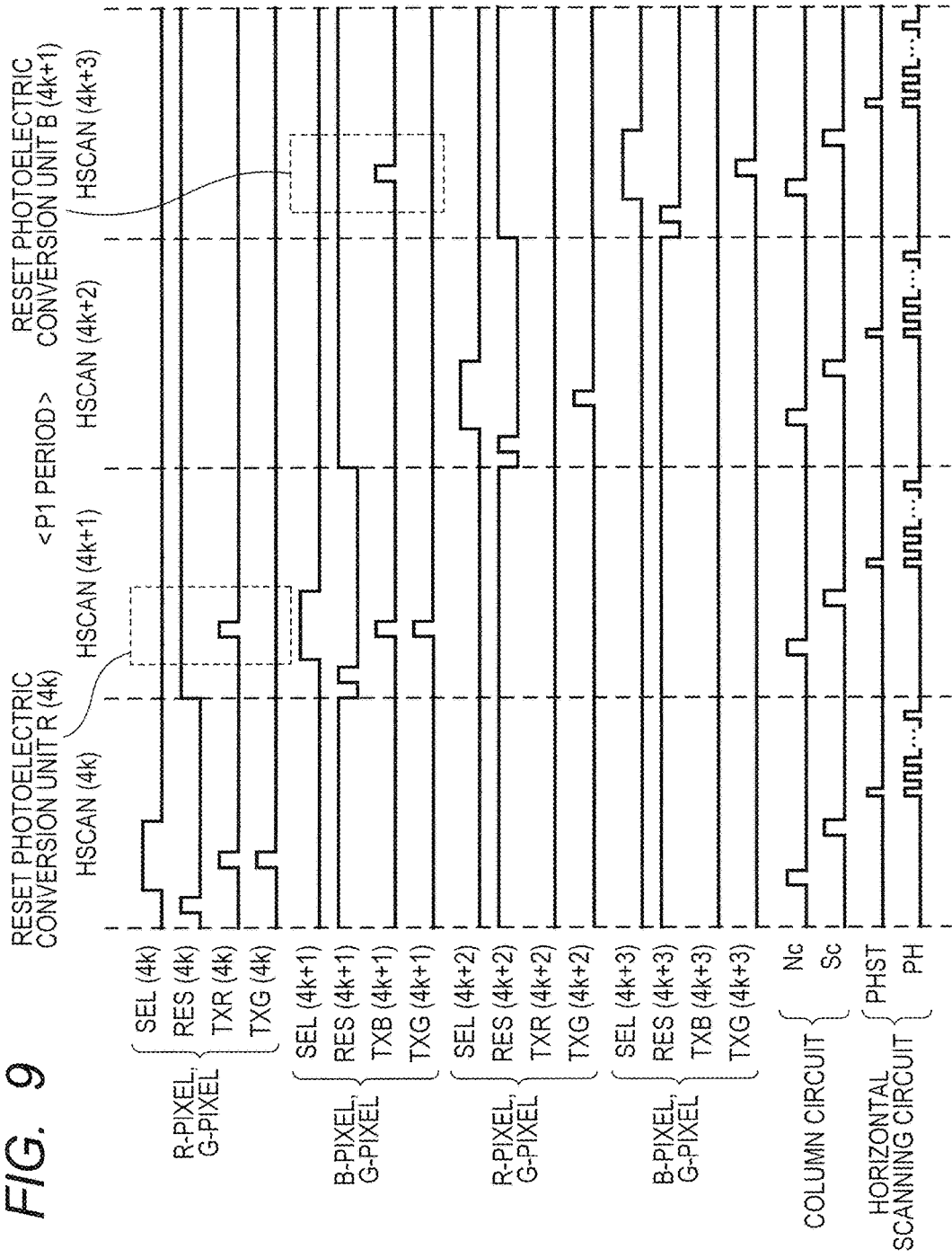
FIG. 9 is a diagram showing an exemplary timing chart of a first period P1 for components of the solid-state imaging apparatus according to the third embodiment of the present invention.

FIG. 9 is a diagram showing an exemplary timing chart of the first period P1 for components of the solid-state imaging apparatus 100 according to the third embodiment of the present invention. Specifically, FIG. 9 shows an exemplary timing chart of signal processing for pixels 110 in the 4k-th row to (4k+3)-th row in the first period P1.

Resetting of the photoelectric conversion portions 111 will be described by taking the R-pixels 110-R and G-pixels 110-G in the 4k-th row as an example.

At a stage indicated by HSCAN (4k), the charges are transferred from the photoelectric conversion portions 111 of the R-pixels 110-R and G-pixels 110-G in the 4k-th row to the FD units 116, and an image signal voltage S corresponding to the amounts of transferred charges is held by the signal holding unit of the column circuit 132. Next, PHST is set to Hi, causing the horizontal scanning circuit 133 to start scanning. Then, each time PH is set to Hi, plural columns of pixels 110 in the 4k-th row are selected in sequence, thereby outputting the image signals of the pixels 110 (R-pixels 110-R and G-pixels 110-G) in the 4k-th row in sequence via the output amplifier 134. After the last column of the pixel unit is scanned, the horizontal scanning circuit 133 moves to a stage indicated by HSCAN (4k+1).

At a stage indicated by HSCAN (4k+1), the vertical selecting circuit 120 sets the control line RES (4k) of the 4k-th row to Hi. Consequently, electric potential of the FD units 116 is reset to power supply potential. Next, as the control line TXR (4k) is set to Hi, the transfer transistors 112 of only the R-pixels 110-R in the 4k-th row turn on. Consequently, after the charges are transferred from the photoelectric conversion portions 111 of the R-pixels 110-R to the FD units 116, since the reset transistors 114 are on, the charges are reset without being held in the FD units 116. Since the control line TXG (4k) remains Low, the charges of the G-pixels 110-G remain to be reset.

Similarly, the B-pixels 110-B in the (4k+1)-th row reset the photoelectric conversion portions 111 independently. When the row is not selected, the control line RES (4k+1) is fixed at Hi. If the control line TXB (4k+1) is set to Hi in this state, the photoelectric conversion portions 111 of only the B-pixels 110-B can be reset.

As described above, according to the third embodiment, the image signal output interval of the G-pixel group is set shorter than the image signal output intervals of the R-pixel group and B-pixel group and the charge accumulation periods of the R-pixel group and B-pixel group are adjusted independently.

This configuration allows the image signal output of the G-pixel group, R-pixel group and B-pixel group to be adjusted more finely while improving the resolution of color motion imaging in the time direction. That is, the third embodiment can keep the resolution of color motion imaging at a high level in the time direction and thereby improve the quality of moving images.

Fourth Embodiment

Next, a fourth embodiment of the present invention will be described.

Figure 10:
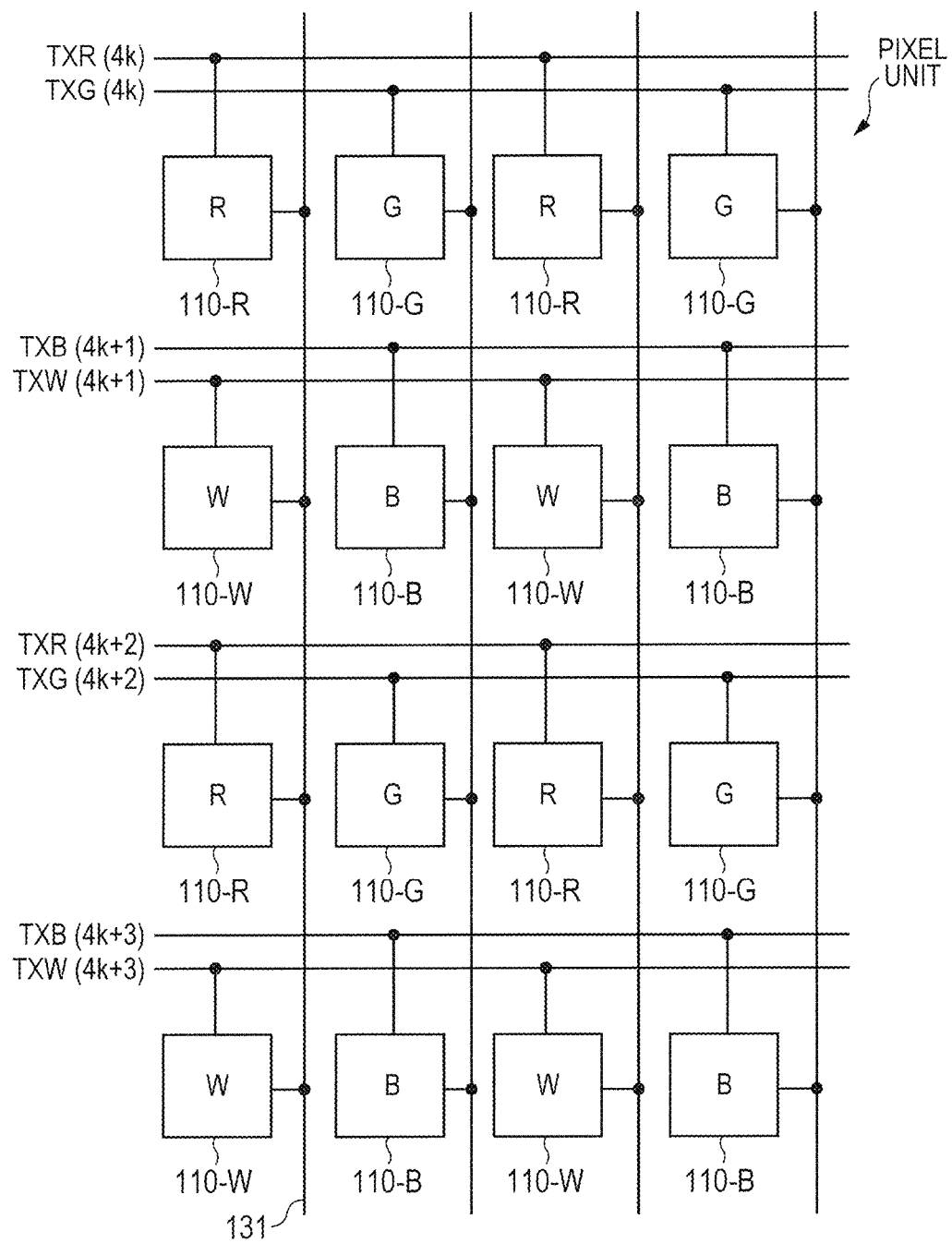
FIG. 10 is a diagram showing an exemplary schematic configuration of a pixel unit alone of a solid-state imaging apparatus according to a fourth embodiment of the present invention.

FIG. 10 is a diagram showing an exemplary schematic configuration of a pixel unit alone of a solid-state imaging apparatus according to the fourth embodiment of the present invention. Note that although pixels 110 disposed so as to make up a 4-row by 4-column matrix are shown in FIG. 10 for simplicity's sake, actually a larger number of pixels 110 are disposed, making up larger numbers of rows and columns.

The pixel unit shown in FIG. 10 includes at least plural W-pixels 110-W (fourth pixel group) adapted to detect light in an entire visible wavelength band in addition to G-pixels 110-G (first pixel group), R-pixels 110-R (second pixel group) and B-pixels 110-B (third pixel group) shown in FIG. 1. Typically, the W-pixels 110-W have the highest sensitivity, followed by the G-pixels 110-G, and then the R-pixels 110-R or B-pixels 110-B. In FIG. 10, the G-pixels 110-G, R-pixels 110-R, B-pixels 110-B and W-pixels 110-W are denoted by "G," "R," "B," and "W," respectively. According to the present embodiment, a set of a G-pixel 110-G, R-pixel 110-R, B-pixel 110-B and W-pixel 110-W are disposed so as to make up a 2-row by 2-column matrix, and the 2-row by 2-column matrices are disposed repeatedly. Also, the transfer transistors 112 of the pixels 110 of different colors are configured to be controllable independently via respective control lines TXG, TXR, TXB and TXW.

FIG. 11 is a diagram showing an exemplary image signal output sequence of the solid-state imaging apparatus 100 according to the fourth embodiment of the present invention. In FIG. 11, the slant lines indicate read start times of rows of pixels 110, and higher-numbered rows are read as the slant lines go downward.

In the example shown in FIG. 11, in a first period P1, the output unit 130 outputs the pixel signals of all the W-pixels 110-W in sequence from every row in which W-pixels 110-W exist (output image signal W(all) in FIG. 11).

Regarding the G-pixels 110-G, the output unit 130 outputs every fourth row beginning with the first row in which G-pixels 110-G exist (output image signal G(4n) in FIG. 11). That is, as shown in FIG. 10, since G-pixels 110-G exist as a pixel array only every second row, if only the G-pixels 110-G are noted, the output unit 130 outputs the image signals of G-pixels 110-G at a rate equivalent to one in every two rows. Regarding the R-pixels 110-R, the output unit 130 outputs every sixth row beginning with the first row in which R-pixels 110-R exist (output image signal R(6k) in FIG. 11). That is, as shown in FIG. 10, since R-pixels 110-R exist as a pixel array only every second row, if only the R-pixels 110-R are noted, the output unit 130 outputs the image signals of R-pixels 110-R at a rate equivalent to one in every three rows. Regarding the B-pixels 110-B, the output unit 130 outputs every sixth row beginning with the row next to the first row in which B-pixels 110-B exist (output image signal B(6k+1) in FIG. 11). That is, as shown in FIG. 10, since B-pixels 110-B exist as a pixel array only every second row, if only the B-pixels 110-B are noted, the output unit 130 outputs the image signals of B-pixels 110-B at a rate equivalent to one in every three rows.

Also, in the example shown in FIG. 11, in a second period P2 different from the first period P1, the output unit 130 outputs the pixel signals of all the W-pixels 110-W in sequence from every row in which W-pixels 110-W exist (output image signal W(all) in FIG. 11). Regarding the G-pixels 110-G, the output unit 130 outputs every fourth row beginning with the second row after the first row in which G-pixels 110-G exist (output image signal G(4n+2) in FIG. 11). That is, as shown in FIG. 10, since G-pixels 110-G exist as a pixel array only every second row, if only the G-pixels 110-G are noted, the output unit 130 outputs the image signals of the G-pixels 110-G not output in the first period P1, at a rate equivalent to one in every two rows. Regarding the R-pixels 110-R, the output unit 130 outputs every sixth row beginning with the second row after the first row in which R-pixels 110-R exist (output image signal R(6k+2) in FIG. 11). That is, as shown in FIG. 10, since R-pixels 110-R exist as a pixel array only every second row, if only the R-pixels 110-R are noted, the output unit 130 outputs the image signals of the R-pixels 110-R not output in the first period P1, at a rate equivalent to one in every three rows. Regarding the B-pixels 110-B, the output unit 130 outputs every sixth row beginning with the third row after the first row in which B-pixels 110-B exist (output image signal B(6k+3) in FIG. 11). That is, as shown in FIG. 10, since B-pixels 110-B exist as a pixel array only every second row, if only the B-pixels 110-B are noted, the output unit 130 outputs the image signals of the B-pixels 110-B not output in the first period P1, at a rate equivalent to one in every three rows.

Also, in the example shown in FIG. 11, in a third period P3 different from the first period P1 and second period P2, the output unit 130 outputs the pixel signals of all the W-pixels 110-W in sequence from every row in which W-pixels 110-W exist (output image signal W(all) in FIG. 11). Regarding the G-pixels 110-G, the output unit 130 outputs every fourth row beginning with the first row in which G-pixels 110-G exist (output image signal G(4n) in FIG. 11). That is, if only the G-pixels 110-G are noted, the output unit 130 outputs the image signals of the same G-pixels 110-G as output in the first period P1, at a rate equivalent to one in every two rows. Regarding the R-pixels 110-R, the output unit 130 outputs every sixth row beginning with the fourth row after the first row in which R-pixels 110-R exist (output image signal R(6k+4) in FIG. 11). That is, if only the R-pixels 110-R are noted, the output unit 130 outputs the image signals of the R-pixels 110-R not output in either the first period P1 or second period P2, at a rate equivalent to one in every three rows. Regarding the B-pixels 110-B, the output unit 130 outputs every sixth row beginning with the fifth row after the first row in which B-pixels 110-B exist (output image signal B(6k+5) in FIG. 11). That is, if only the B-pixels 110-B are noted, the output unit 130 outputs the image signals of the B-pixels 110-B not output in either the first period P1 or second period P2, at a rate equivalent to one in every three rows.

Subsequently, by repeating the first period P1 to third period P3, respective image signals are output from the W-pixel group, G-pixel group, R-pixel group and B-pixel group, thereby performing motion imaging.

In the example shown in FIG. 11, the output unit 130 outputs the image signals in such a way that the image signal output interval of the W-pixel group will be shorter than the image signal output intervals of the R-pixel group and B-pixel group. Furthermore, the output unit 130 outputs the image signals in such a way that the image signal output interval of the W-pixel group will be shorter than the image signal output interval of the G-pixel group. Besides, the output unit 130 outputs the image signals in such a way that the image signal output interval of the G-pixel group will be shorter than the image signal output intervals of the R-pixel group and B-pixel group. Specifically, the image signal output interval of the W-pixel group is ½ the image signal output interval of the G-pixel group and ⅓ the image signal output intervals of the R-pixel group and B-pixel group.

That is, the image signal output intervals of the W-pixel group, G-pixel group, R-pixel group and B-pixel group increase in this order. In this way, by reducing the image signal output intervals of the W-pixel group, G-pixel group, R-pixel group and B-pixel group in descending order of contribution to luminance, the resolution of color motion imaging in the time direction can be improved.

According to the present embodiment, as shown in FIG. 10, the ratio among the W-pixel group, G-pixel group, R-pixel group and B-pixel group is 1:1:1:1, but may be changed according to use. Also, according to the present embodiment, scanning is done by spatially skipping, in a vertical scanning period, part of the G-pixel group, R-pixel group and B-pixel group longer in the image signal output interval than the W-pixel group, but the present invention is not limited to this aspect. For example, as long as the W-pixel group, which contributes greatly to luminance, is reduced in the image signal output interval, the present invention may adopt an aspect in which the first period P1 involves reading all the pixels of the R-pixel group or B-pixel group without spatial skipping and the second period P2 involves reading no pixel of the R-pixel group or B-pixel group.

Also, in the present embodiment, for example, the charge accumulation period of each pixel 110 may be set according to the length of the image signal output interval. In this case, for example, the charge accumulation period of the W-pixel group may be set shorter than the charge accumulation periods of the R-pixel group and B-pixel group.

Also, in the example described in the present embodiment, the W-pixel group has a shorter image signal output interval than the G-pixel group, which in turn has a shorter image signal output interval than the R-pixel group and B-pixel group. As another example, the G-pixel group, R-pixel group and B-pixel group may have equal image signal output intervals and the image signal output interval of the W-pixel group may be set shorter than the image signal output interval of the G-pixel group (i.e., the image signal output interval of the R-pixel group and image signal output interval of the B-pixel group). Similarly, regarding the charge accumulation period, the G-pixel group, R-pixel group and B-pixel group may have equal charge accumulation periods and the charge accumulation period of the W-pixel group may be set shorter than the charge accumulation period of the G-pixel group (i.e., the charge accumulation period of the R-pixel group and charge accumulation period of the B-pixel group).

FIGS. 12A to 12C are diagrams showing an example of image signals of pixels 110 in six rows beginning with the 6k-th row in a first period P1 to a third period P3 in the fourth embodiment of the present invention.

Specifically, FIG. 12A shows an example of the image signals of the pixels 110 in the six rows beginning with the 6k-th row in the first period P1, FIG. 12B shows an example of the image signals of the pixels 110 in the six rows beginning with the 6k-th row in the second period P2, and FIG. 12C shows an example of the image signals of the pixels 110 in the six rows beginning with the 6k-th row in the third period P3.

In FIGS. 12A to 12C, of the G-pixels 110-G, R-pixels 110-R and B-pixels 110-B, the gray-shaded pixels are those which output dummy signals. In this way, according to the present embodiment, some of G-pixels 110-G, R-pixels 110-R and B-pixels 110-B in a same period lack image signals. To deal with this, the lacking image signals may be interpolated using the image signals of the G-pixels 110-G, R-pixels 110-R and B-pixels 110-B of the preceding and succeeding rows in the same period. Alternatively, the lacking image signals may be interpolated using the image signals of the G-pixels 110-G, R-pixels 110-R and B-pixels 110-B of the same row in the preceding period. Alternatively, interpolation may be performed using both the image signals of the same row in the preceding period and the image signals of the preceding and succeeding rows in the same period described above.

Generalization of Fourth Embodiment

In the fourth embodiment described above, "the image signals of the G-pixels are output at a rate equivalent to one in every two rows and the image signals of the R-pixels and B-pixels are output at a rate equivalent to one in every three rows." In the present invention, this can be applied in a generalized form as follows. That is, according to the present invention, "the image signals of the G-pixels are output at a rate of i in every j rows where i and j are positive integers such that i/j<1 while image signals of the R-pixels and B-pixels are output at a rate of k in every l rows where k and l are positive integers such that k/l<i/j." That is, it is obvious that the configuration in which image signals are output so as to satisfy these conditions can achieve the operation and effects of keeping the resolution of color motion imaging at a high level in the time direction and thereby improving the quality of moving images.

Variations of Fourth Embodiment

Note that the fourth embodiment has been described by citing an aspect of the solid-state imaging apparatus 100 containing, as a pixel unit, at least a W-pixel group, R-pixel group, G-pixel group and B-pixel group with W, R, G and B color filters disposed thereon, respectively. However, the fourth embodiment is not limited to this aspect. For example, the fourth embodiment can also include an aspect in which the solid-state imaging apparatus 100 contains, as a pixel unit, at least an IR pixel group adapted to detect infrared light as well as a cyan pixel group, yellow pixel group, green pixel group and magenta pixel group with cyan (C), yellow (Y), green (G) and magenta (Mg) color filters disposed thereon, respectively. In this aspect, the output unit 130 produces outputs, for example, by setting the image signal output interval of the IR pixel group shorter than the image signal output intervals of the cyan pixel group, green pixel group and yellow pixel group. Note that this aspect is applicable to the present invention as long as the image signal output interval of the IR pixel group is shorter than the image signal output interval of at least one of the cyan pixel group, green pixel group and yellow pixel group.

Note that the pixel unit may be configured to include R-pixels, G-pixels, B-pixels, and IR pixels. The R-pixels, G-pixels, and B-pixels include an IR cutoff filter adapted to cut infrared light. In this case, the IR pixels may become more sensitive to light than are the R-pixels, G-pixels, and B-pixels. Thus, the image signal output interval of the IR-pixel is set shorter than any of the R-pixels, G-pixels, and B-pixels. On the other hand, the present embodiment may be configured such that the R-pixels, G-pixels, and B-pixels will not be provided with an IR cutoff filter. In this case, infrared light will enter the R-pixels, G-pixels, and B-pixels as well. This makes the IR-pixels less sensitive to light than are the R-pixels, G-pixels, and B-pixels. Thus, the image signal output interval of the IR pixels is set longer than any of the R-pixels, G-pixels, and B-pixels. In terms of the charge accumulation period, the different types of pixels can be ranked in the same order as in terms of the image signal output interval.

Fifth Embodiment

Next, a fifth embodiment of the present invention will be described.

A schematic configuration of a pixel unit of a solid-state imaging apparatus according to the fifth embodiment is similar to the schematic configuration of the pixel unit of the solid-state imaging apparatus according to the fourth embodiment shown in FIG. 10. That is, in the schematic configuration of the pixel unit of the solid-state imaging apparatus according to the fifth embodiment, plural 2-row by 2-column matrices each made up of a W-pixel 110-W, G-pixel 110-G, R-pixel 110-R, and B-pixel 110-B are arranged as shown in FIG. 10. Also, a circuit configuration of the solid-state imaging apparatus according to the fifth embodiment is similar to the circuit configuration of the solid-state imaging apparatus 100 according to the first embodiment shown in FIG. 2 except for the pixel unit.

Figure 13:
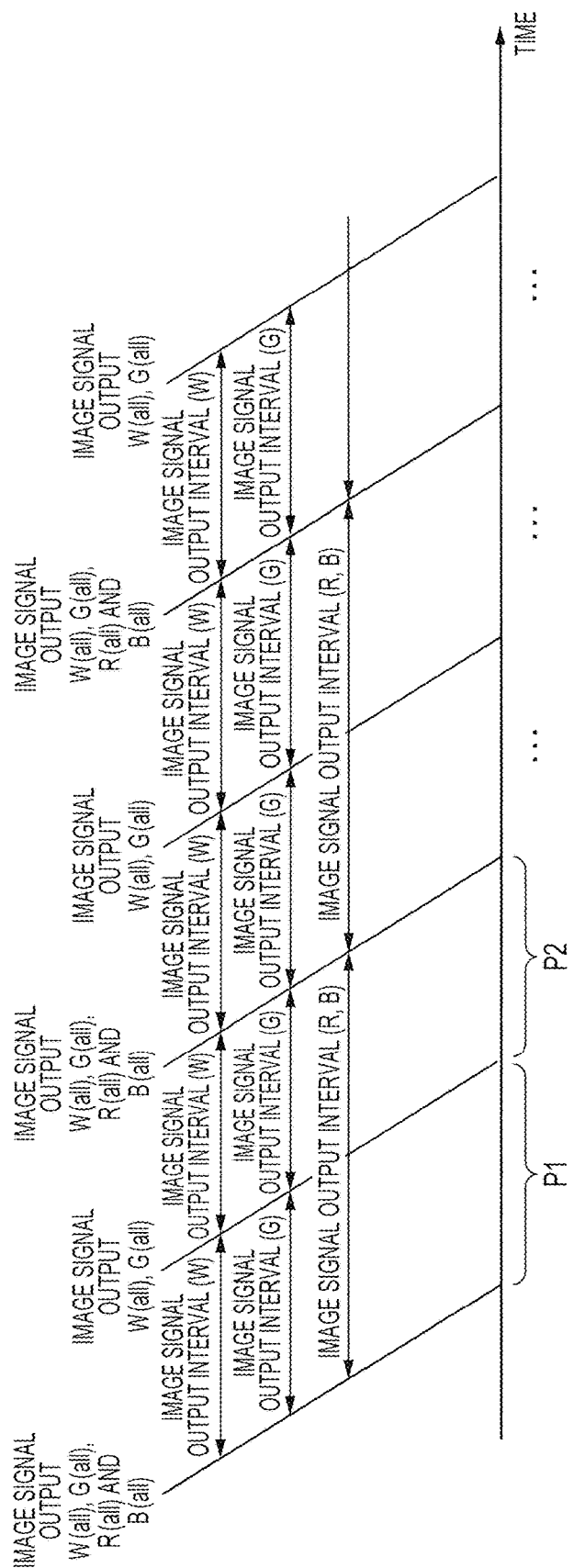
FIG. 13 is a diagram showing an exemplary image signal output sequence of a solid-state imaging apparatus according to a fifth embodiment of the present invention.

FIG. 13 is a diagram showing an exemplary image signal output sequence of the solid-state imaging apparatus 100 according to the fifth embodiment of the present invention. In FIG. 13, the slant lines indicate read start times of rows of pixels 110, and higher-numbered rows are read as the slant lines go downward.

In the example shown in FIG. 13, in a first period P1, the output unit 130 outputs the image signals of all the W-pixels 110-W in sequence from every row in which W-pixels 110-W exist (output image signal W(all) in FIG. 13). Regarding the G-pixels 110-G, the output unit 130 also outputs the image signals of all the G-pixels 110-G in sequence from every row in which G-pixels 110-G exist (output image signal G(all) in FIG. 13). Also, regarding the R-pixels 110-R, the output unit 130 also outputs the image signals of all the R-pixels 110-R in sequence from every row in which R-pixels 110-R exist (output image signal R(all) in FIG. 13). Also, regarding the B-pixels 110-B, the output unit 130 also outputs the image signals of all the B-pixels 110-B in sequence from every row in which B-pixels 110-B exist (output image signal B(all) in FIG. 13).

Also, in the example shown in FIG. 13, in a second period P2 different from the first period P1, the output unit 130 outputs the image signals of all the W-pixels 110-W in sequence from every row in which W-pixels 110-W exist (output image signal W(all) in FIG. 13). Regarding the G-pixels 110-G, the output unit 130 also outputs the image signals of all the G-pixels 110-G in sequence from every row in which G-pixels 110-G exist (output image signal G(all) in FIG. 13). Regarding the R-pixels 110-R and B-pixels 110-B, the output unit 130 does not output image signals.

Subsequently, by repeating the first period P1 and second period P2, the image signal output intervals of the W-pixel group and G-pixel group can be set shorter than the image signal output intervals of the R-pixel group and B-pixel group.

FIGS. 14A to 14C are diagrams showing an example of image signals of pixels 110 in six rows beginning with the 6k-th row in a first period P1 and second period P2 in the fifth embodiment of the present invention. Specifically, FIGS. 14A and 14C show an example of the image signals of the pixels 110 in the six rows beginning with the 6k-th row in the first period P1 and FIG. 14B shows an example of the image signals of the pixels 110 in the six rows beginning with the 6k-th row in the second period P2.

In FIG. 14B, of the R-pixels 110-R and B-pixels 110-B, the gray-shaded pixels are those which output dummy signals. In this way, according to the present embodiment, during image signal output in the second period P2, the R-pixels 110-R and B-pixels 110-B lack image signals completely. To deal with this, an image interpolation unit in a succeeding stage may use the image signals of the R-pixels 110-R and B-pixels 110-B in a previous frame as they are. Alternatively, a frame memory capable of holding image signals for a few frame periods may be provided to use, for interpolation, the image signals of preceding and succeeding R-pixels 110-R and B-pixels 110-B as well as the image signals of the G-pixels 110-G and W-pixels 110-W in the same frame.

Variation of Fifth Embodiment

Note that the fifth embodiment has been described by citing an aspect of the solid-state imaging apparatus 100 containing, as a pixel unit, at least a W-pixel group, R-pixel group, G-pixel group and B-pixel group with W, R, G and B color filters disposed thereon, respectively. However, the fifth embodiment is not limited to this aspect. For example, the fifth embodiment can also include an aspect in which the solid-state imaging apparatus 100 contains, as a pixel unit, at least an IR pixel group adapted to detect infrared light as well as a cyan pixel group, yellow pixel group, green pixel group and magenta pixel group with cyan (C), yellow (Y), green (G) and magenta (Mg) color filters disposed thereon, respectively. In this aspect, the output unit 130 produces outputs, for example, by setting the image signal output interval of the IR pixel group shorter than the image signal output intervals of the cyan pixel group, green pixel group and yellow pixel group. Note that this aspect is applicable to the present invention as long as the image signal output interval of the IR pixel group is shorter than the image signal output interval of at least one of the cyan pixel group, green pixel group and yellow pixel group.

Sixth Embodiment

Next, a sixth embodiment of the present invention will be described.

Figure 15:
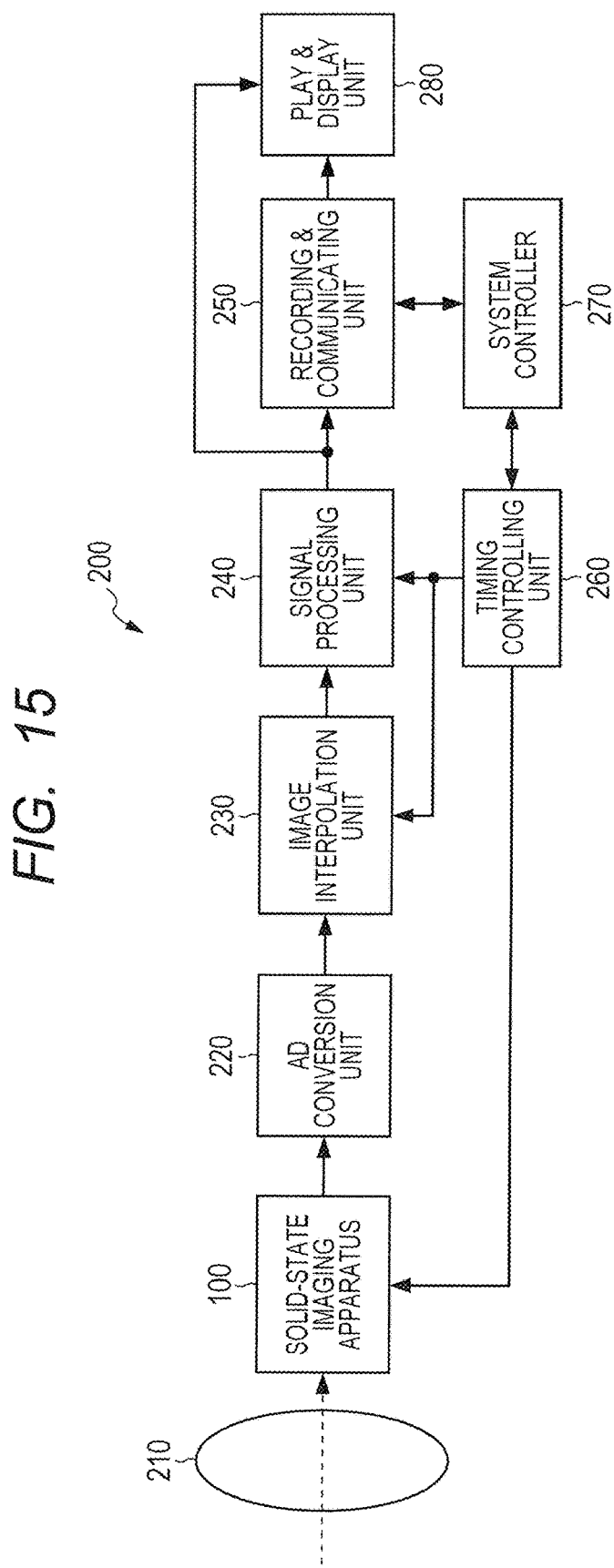
FIG. 15 is a diagram showing an exemplary schematic configuration of an imaging system according to a sixth embodiment of the present invention including the solid-state imaging apparatus according to any of the embodiments described above.

FIG. 15 is a diagram showing an exemplary schematic configuration of an imaging system 200 according to a sixth embodiment of the present invention including the solid-state imaging apparatus 100 according to any of the embodiments described above.

As shown in FIG. 15, the imaging system 200 includes an optical system 210, the solid-state imaging apparatus 100, an AD conversion unit 220, an image interpolation unit 230, a signal processing unit 240, a recording & communicating unit 250, a timing control unit 260, a system controller 270 and a play & display unit 280.

A concept of the imaging system 200 shown in FIG. 15 includes an apparatus, such as a camera, primarily intended for photography. Also, the concept of the imaging system 200 shown in FIG. 15 includes not only the apparatus primarily intended for photography, but also an apparatus (e.g., a personal computer and portable terminal) secondarily equipped with a photography function. Also, the imaging system 200 shown in FIG. 15 includes the solid-state imaging apparatus 100 according to any of the first to fifth embodiments described above, and the image interpolation unit 230 adapted to interpolate any lacking part (missing part) in an image signal output from the solid-state imaging apparatus 100. Also, the imaging system 200 shown in FIG. 15 includes the AD conversion unit 220 adapted to convert the image signal output by the solid-state imaging apparatus 100 from analog to digital and a processor adapted to process digital data output from the AD conversion unit 220 as well as the play & display unit 280 adapted to display images based on the image signal.

In FIG. 15, the optical system 210 forms an image of a subject in the pixel unit of the solid-state imaging apparatus 100. The solid-state imaging apparatus 100 performs an imaging operation according to a signal from the timing control unit 260 and outputs an image signal. The image signal output by the solid-state imaging apparatus 100 is supplied to the AD conversion unit 220.

The AD conversion unit 220 converts the analog image signal output by the solid-state imaging apparatus 100 into a digital image signal. The image interpolation unit 230 interpolates the dummy signals or missing part of the image signal output from the solid-state imaging apparatus 100 and supplies the resulting signal to the signal processing unit 240. The signal processing unit 240 processes the image signal output by the image interpolation unit 230 into a form suitable for recording and display. The recording & communicating unit 250 sends the image signal to the play & display unit 280, causing the play & display unit 280 to reproduce and display an image based on the image signal. The recording & communicating unit 250 and signal processing unit 240 record the image on a recording medium (not shown).

The timing control unit 260 controls drive timings of the solid-state imaging apparatus 100, image interpolation unit 230 and signal processing unit 240 under the control of the system controller 270. The system controller 270, which is designed to exert overall control over operation of the imaging system 200, controls, for example, operation of the optical system 210, timing control unit 260, recording & communicating unit 250 and play & display unit 280. Also, the system controller 270 includes, for example, a recording apparatus (not shown), on which programs and the like needed to control the operation of the imaging system 200 have been recorded.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

It should be noted that the embodiments described above merely illustrate concrete examples of carrying out the present invention and are not to be interpreted as limiting the true scope of the invention. That is, the present invention can be implemented in various forms without departing from the technical idea or major features of the invention.

The present invention can keep the resolution of color motion imaging at a high level in the time direction and thereby improve the quality of moving images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-213122, filed Oct. 17, 2014, which is hereby incorporated by reference herein in its entirety.

What is claimed is:

1. A driving method of a solid-state imaging apparatus comprising a pixel unit including:
  a first pixel having a higher sensitivity in a first wavelength band than in a second wavelength band and a third wavelength band, and configured to output a first pixel signal,
  a second pixel having a higher sensitivity in the second wavelength band than in the first wavelength band and the third wavelength band, and configured to output a second pixel signal, a third pixel having a higher sensitivity in the third wavelength band than in the first wavelength band and the second wavelength band, and configured to output a third pixel signal, and a fourth pixel having a higher sensitivity to a light than a sensitivity to the light of the first, second and third pixels, and configured to output a fourth pixel signal, the method comprising:

outputting first pixel signals from the first pixel at a first interval;

outputting second pixel signals from the second pixel at a second interval;

outputting third pixel signals from the third pixel at a third interval; and outputting fourth pixel signals from the fourth pixel at a fourth interval, wherein a contribution of the first pixel signal to a luminance of an image signal generated by the first, second and third pixel signals is higher than a contribution of the second pixel signal to the luminance and a contribution of the third pixel signal to the luminance, and the first interval and the fourth interval are shorter than the second interval and the third interval, and the fourth interval is shorter than the first interval.

2. The driving method according to claim 1, wherein a charge accumulation period of the first pixel is shorter than charge accumulation periods of the second and third pixels.

3. The driving method according to claim 1, wherein the pixel unit further includes:

a first pixel group including a plurality of the first pixels,
a second pixel group including a plurality of the second pixels, and
a third pixel group including a plurality of the third pixels, wherein:

during a first period, the first pixels in the first pixel group output first pixel signals, while second pixels of a part of the plurality of the second pixels in the second pixel group output second pixel signals and third pixels of a part of the plurality of the third pixels in the third pixel group output third pixel signals, during a second period different from the first period, the first pixels in the first pixel group output the first pixel signals, during the second period, second pixels of the other part of the plurality of the second pixels in the second pixel group output second pixel signals, and during the second period, third pixels of the other part of the plurality of the third pixels in the third pixel group output third pixel signals.

4. The driving method according to claim 3, wherein positive integers m and n meet a relation: m/n<1, m/n of the plurality of the second pixels in the second pixel group output second pixel signals during the first period, (1−m/n) of the plurality of the second pixels in the second pixel group output second pixel signals during the second period, m/n of the plurality of the third pixels in the third pixel group output third pixel signals during the first period, and (1−m/n) of the plurality of the third pixels in the third pixel group output third pixel signals during the second period.

5. The driving method according to claim 1, wherein a charge accumulation period of the first pixel, a charge accumulation period of the second pixel and a charge accumulation period of the third pixel are controlled independently to each other.

6. The driving method according to claim 1, wherein:
the first pixel has a highest sensitivity to green light among red, green and blue lights,
the second pixel has a highest sensitivity to the red light among the red, green and blue lights, and
the third pixel has a highest sensitivity to the blue light among the red, green and blue lights.

7. The driving method according to claim 1, wherein a charge accumulation period of the fourth pixel is shorter than charge accumulation periods of the second and the third pixels.

8. The driving method according to claim 1, wherein the pixel unit further includes:

a first pixel group including a plurality of the first pixels,
a second pixel group including a plurality of the second pixels,
a third pixel group including a plurality of the third pixels, and
a fourth pixel group including a plurality of fourth pixels each having a higher sensitivity to a light than the first, second and third pixels, wherein:

during a third period, the plurality of fourth pixels in the fourth pixel group output fourth pixel signals, while first pixels of a part of the plurality of the first pixels in the first pixel group output first pixel signals, second pixels of a part of the plurality of the second pixels in the second pixel group output second pixel signals, and third pixels of a part of the plurality of the third pixels in the third pixel group output third pixel signals, during a fourth period different from the third period, the fourth pixels in the fourth pixel group output the fourth pixel signals, during the fourth period, first pixels of the other part of the plurality of the first pixels in the first pixel group output first pixel signals, and during the fourth period, second pixels of the other part of the plurality of the second pixels in the second pixel group output second pixel signals, and during the fourth period, third pixels of the other part of the plurality of the third pixels in the third pixel group output third pixel signals.

9. The driving method according to claim 1, wherein the pixel unit further includes an IR pixel detecting an infrared light among the light, and the IR pixel outputs fifth pixel signals at a sixth interval longer than the first, second and third intervals.

10. The driving method according to claim 1, wherein the pixel unit further includes an IR pixel detecting an infrared light among the light, and the IR pixel outputs fifth pixel signals at a sixth interval shorter than the first interval.

11. The driving method according to claim 1, wherein the third interval is equal to the second interval.

12. The driving method according to claim 1, wherein the generating the image signal is performed at a fifth interval, and the first interval and the fifth interval are shorter than the second interval and the third interval.

13. The driving method according to claim 12, wherein the fifth interval is equal to the first interval.

14. The driving method according to claim 1, wherein a contribution of the fourth pixel signal to a luminance of the image signal is higher than a contribution of the first pixel signal to the luminance.

15. A solid-state imaging apparatus comprising:

a pixel unit including:

a first pixel having a higher sensitivity in a first wavelength band than in a second wavelength band and a third wavelength band, and configured to output a first pixel signal, a second pixel having a higher sensitivity in the second wavelength band than in the first wavelength band and the third wavelength band, and configured to output a second pixel signal, a third pixel having a higher sensitivity in the third wavelength band than in the first wavelength band and the second wavelength band, and configured to output a third pixel signal; and a fourth pixel having a higher sensitivity to a light than a sensitivity to the light of each of the first, second and third pixels; and a control unit configured to control the pixel unit to output first pixel signals from the first pixel at a first interval, second pixel signals from the second pixel at a second interval, third pixel signals from the third pixel at a third interval, and fourth pixel signals from the fourth pixel at a fourth interval, wherein a contribution of the first pixel signal to a luminance of an image signal generated by the first, second and third signals is higher than a contribution of the second pixel signal to the luminance and a contribution of the third pixel signal to the luminance, and the first interval and the fourth interval are shorter than the second interval and the third interval, and the fourth interval is shorter than the first interval.

16. An imaging system comprising:

the solid-state imaging apparatus according to claim 15; and a signal processing apparatus configured to process an image signal output from the solid-state imaging apparatus.

17. The imaging system according to claim 16, further comprising an image interpolation unit configured to interpolate a deficiency of the image signal outputted from the solid-state imaging apparatus.

18. A solid-state imaging apparatus comprising:

a pixel unit including:

a green pixel configured to output a first pixel signal, a red pixel configured to output a second pixel signal, a blue pixel configured to output a third pixel signal, and a white pixel configured to output a fourth pixel signal; and a control unit configured to control the pixel unit to output first pixel signals from the green pixel at a first interval, second pixel signals from the red pixel at a second interval, third pixel signals from the blue pixel at a third interval and fourth pixel signals from the white pixel at a fourth interval, wherein the first and fourth intervals are shorter than the second and third intervals, and the fourth interval is shorter than the first interval.

19. The apparatus according to claim 18, wherein a contribution of the first pixel signal to a luminance of the image signal generated by the first, second and third pixel signals is higher than a contribution of the second pixel signal to the luminance and a contribution of the third pixel signal to the luminance.

20. The apparatus according to claim 18, wherein a contribution of the fourth pixel signal to a luminance of the image signal is higher than a contribution of the first pixel signal to the luminance, a contribution of the second pixel signal to the luminance and a contribution of the third pixel signal to the luminance.

* * * * *